United States Patent [19]
Mohapatra et al.

[11] Patent Number: 5,780,207
[45] Date of Patent: Jul. 14, 1998

[54] IMAGING PROCESS FOR IMAGING MATERIALS

[75] Inventors: Sarat K. Mohapatra; Alfredo G. Viglienzoni, both of Woodbury; Gregory W. Onstad, St. Paul, all of Minn.

[73] Assignee: Imation Corp., Oakdale, Minn.

[21] Appl. No.: 785,189

[22] Filed: Jan. 17, 1997

Related U.S. Application Data

[63] Continuation of Ser. No. 482,983, Jun. 7, 1995, abandoned, which is a continuation of Ser. No. 198,970, May 11, 1994, abandoned.

[51] Int. Cl.$^6$ ...................................... G03C 5/08
[52] U.S. Cl. .................. 430/348; 430/350; 430/353; 430/945; 430/952; 341/225; 341/233
[58] Field of Search ......................... 430/348, 350, 430/353, 952, 945; 347/233, 225, 240, 251

[56] References Cited

U.S. PATENT DOCUMENTS

| | | | |
|---|---|---|---|
| 3,614,307 | 10/1971 | Sasabe et al. | 358/469 |
| 4,244,005 | 1/1981 | Jurgensen | 358/201 |
| 4,384,297 | 5/1983 | Ohara et al. | 347/247 |
| 4,395,766 | 7/1983 | Ohnishi et al. | 369/47 |
| 4,476,474 | 10/1984 | Kitamura | 347/240 |
| 4,775,896 | 10/1988 | Umeda et al. | 358/298 |
| 4,864,326 | 9/1989 | Kawamura et al. | 347/240 |
| 5,317,363 | 5/1994 | Isaka et al. | 355/27 |
| 5,398,052 | 3/1995 | Isaka et al. | 347/233 |

FOREIGN PATENT DOCUMENTS

| | | | |
|---|---|---|---|
| 0 485 148 A2 | 5/1992 | European Pat. Off. | |
| 0485148 | 5/1992 | European Pat. Off. | |
| 4-051043 | 2/1992 | Japan | 430/353 |

Primary Examiner—John A. McPherson
Attorney, Agent, or Firm—William K. Weimer

[57] ABSTRACT

A process for exposing a silver halide-containing photothermographic element with radiation to produce a latent image comprising a) providing a source of radiation which emits a beam of radiation to produce a spot having at least one dimension of height or length of less than 600 micrometers at a target site, b) providing at said target site a photothermographic silver halide element sensitive to radiation emitted by said radiation source, c) emitting radiation a first time in an imagewise distribution from said radiation source so that said radiation strikes said element as spots having at least one dimension of length or width which is less than 250 micrometers, and d) then emitting radiation a second time in an imagewise distributed manner so that at least some spots from radiation emitted said second time overlap spots where said first emitted radiation struck said photothermographic element.

21 Claims, 13 Drawing Sheets

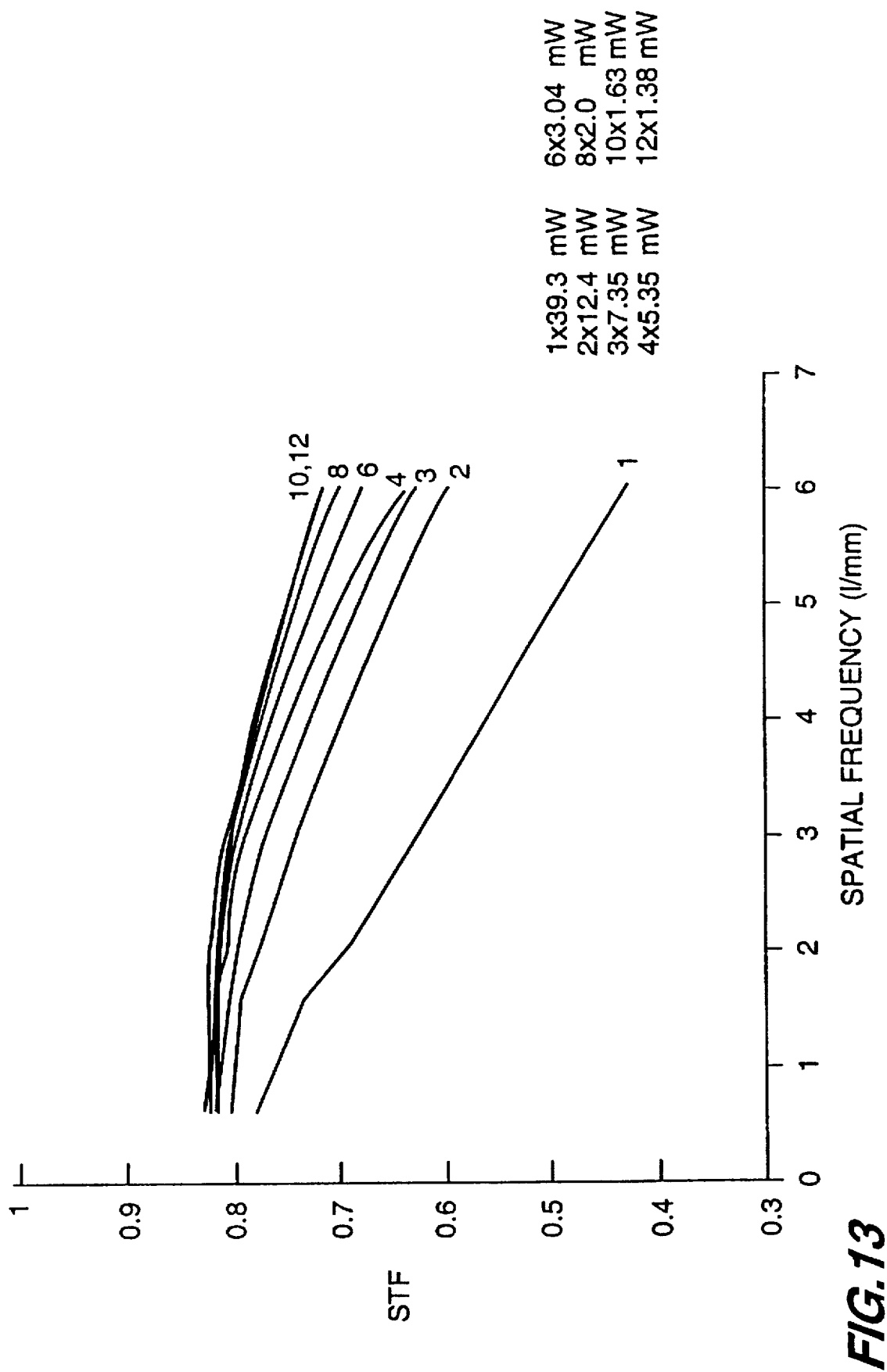

IMAGING PROCESS FOR IMAGING MATERIALS

This is a continuation of application Ser No. 08/482,983 filed Jun. 7, 1995, now abandoned, which is a continuation of application Ser. No. 08/198,970 filed May 11, 1994, now abandoned.

BACKGROUND OF THE INVENTION

1. Field of the Invention

The present invention relates to an imaging process for use in the exposure of silver halide based photothermographic imaging elements, particularly processes in which such photothermographic elements are raster scanned by narrow beams or coherent radiation.

2. Background of the Art

Semiconductor laser diodes are used extensively in photographic recording devices in both the Medical and Graphic Arts markets, in medical imagers and imagesetters, respectively. Current imagesetters utilize infrared laser diodes of typically 5–30 mW power, while the present 3M Medical Laser Imager typically uses a 15 or 30 mW IR laser diode for silver halide applications. The use of semiconductor laser diodes follows from the well established application of conventional lasers (argon ion, helium neon, etc.) in silver halide based recording devices. The increasing popularity of solid state semiconductor laser diodes derives from their greater convenience, reduced size, higher cost-effectiveness, longer service life characteristics, and continuous tone capability.

Photographic elements are often used in conjunction with equipment whose output is recorded by exposing the element to infrared or visible radiation emitted by, for example, semiconductor laser diodes. As an example, in the medical diagnostics field, digital information from computed tomography equipment is often output for viewing on photographic elements. These elements are generally exposed with diode lasers which emit radiation of wavelengths from 630 nm to around 900 nm.

Also in the graphic arts field the photographic elements are designed to be sensitized to the emission wavelength of a laser source. Typical laser sources include argon ion lasers, helium neon lasers and infrared semiconductor laser diodes. These photographic elements are usually designed to produce well defined dots for halftone images. Details of photographic films and papers suitable for phototypesetting applications and scanning applications are described in Sections 11.3 and 11.4 of Research Disclosure 33355, January 1992.

Manufacturers of laser diodes are making good progress in producing single spatial mode higher power laser diodes, which are readily available at 100 mW output, with 250 mW laser diodes obtainable in laboratory quantities. Although laser diodes emitting at infrared wavelengths (>750 nm) are most common, semiconductor lasers which emit in the visible region of the spectrum are available, and the power output of both classes of lasers is gradually increasing.

Although some of the higher power laser diodes are utilized in present imagers, much of photothermographic technology has not taken full advantage of the increased power available.

Photothermography is an established imaging technology. In photothermography, a photosensitive media is exposed to radiation to create a latent image which is then thermally developed.

One of the more preferred photothermographic media comprises a binder, silver halide, organic salt of silver (or other reducible, light-insensitive silver source), and a reducing agent for silver ion. These types of materials have been commercially successful for many years, but have been limited in their general use in the area of medical imaging because of their relatively slow speed and poor image quality as compared to wet processed silver halide imaging systems. This required that the photothermographic imaging systems be exposed to higher energy levels without any improved image capability.

The advent of coherent radiation imaging sources such as lasers, laser diodes and the like has enabled even further advantages for wet processed silver halide imaging systems, but has not created many additional commercial opportunities for photothermography. Even though the higher energy outputs are available for coherent light (as compared to conventional contact exposure or lens exposure), the combined use of highest speed photothermographic systems has not produced a good match for high quality imaging systems as are necessary for such imaging technologies as medical imaging (e.g., ultrasound, tomography, magnetic resonance, radiography, etc.) and graphic arts. The energy requirements for imaging such systems still tend to be too high, and the use of the higher energies in such systems tends to restrain the quality of the image available.

U.S. Pat. No. 4,480,325 discusses the use of high frequency modulation to cause spectral line broadening of the laser diode used with optical disks. This improves the signal to noise ratio performance of optical disc addressing. There is no discussion of the use of this equipment for reducing image artifacts. Another U.S. Patent issued to Cannon (U.S. Pat. No. 4,667,209) claims the use of a multi-longitudinal mode laser diode (each longitudinal mode will correspond to one peak) or an LED (light emitting diode) to reduce interference effects in printing on multilayer media. There is no discussion of the means for generating the multiple longitudinal modes in a laser diode. Presumably, laser diodes are discussed which have multiple longitudinal modes. Low quality or high power laser diodes do have multiple longitudinal modes. It is not always convenient to use these diodes because they give rise to some additional problems such as mode hopping. This means that light power in one mode will jump to a different mode and cause another kind of problem called mode hopping artifacts. High frequency modulation of laser diodes reduces this effect. Additionally, the patent asserts that one needs a spectral linewidth of at least 80 Å for reducing the interference effects.

High frequency modulation of laser diodes has been applied to 3M Medical Laser Imagers using conventional silver halide films. Historically, two things to reduce interference patterns or fringes are used at the same time. For example, an appropriate topcoat layer and the high frequency modulation of the laser diode helped in reducing the interference effects. It is deduced that without the high frequency modulation, the interference effects will still be visible even in conventional silver halide films.

SUMMARY OF THE INVENTION

Photothermographic media may be exposed with coherent radiation in an energy efficient manner which also improves the image quality of the hard copy product (the actual developed image). The media is exposed to coherent radiation which strikes the surface of the media as a moving spot. The spot has a distribution of energy across its width, as shown in FIG. 1. Each spot is generated from a source of image data, and the data drives the imaging source so that the width of each spot in at least the high density information areas overlaps at least a portion of another spot. The overlap may be in either the horizontal direction of the scan, the vertical direction of the scan, or a mixture of the vertical and horizontal components of the scan. The effect of the overlap of the spots of the scan is to enable a decrease in the per spot energy which impacts the media, with an increase in the optical density/energy generated by the multiple exposures as compared to single, higher energy exposures. The multiple scanning technique of the present invention also improves image quality without any need for modifying the media.

BRIEF DESCRIPTION OF THE DRAWINGS

FIG. 13 shows a graph of sharpness transfer function (STF) versus spatial frequency of a photothermographic film element (Film 5) subjected to multiple exposures (1 to 12×). Maximum density was kept at 3.0 for each exposure.

DETAILED DESCRIPTION OF THE INVENTION

Figure 1:
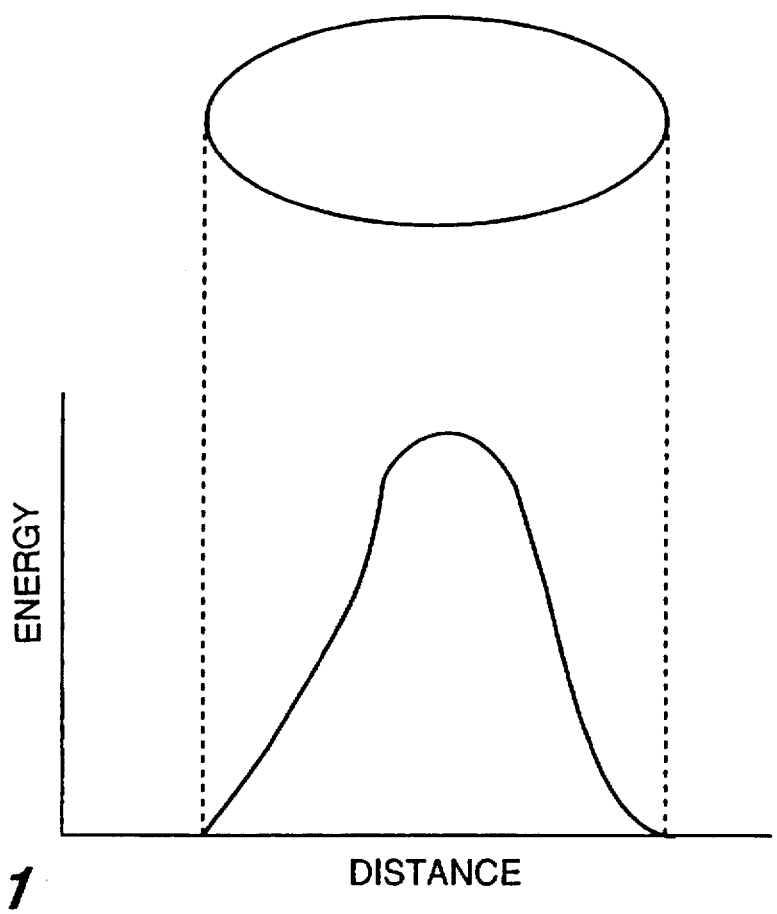
FIG. 1 shows a single oval spot 1 produced by a single exposure from a laser. Below the spot is the energy versus distance along the direction of scanning corresponding to the energy distribution of the spot 1.
Figure 2:
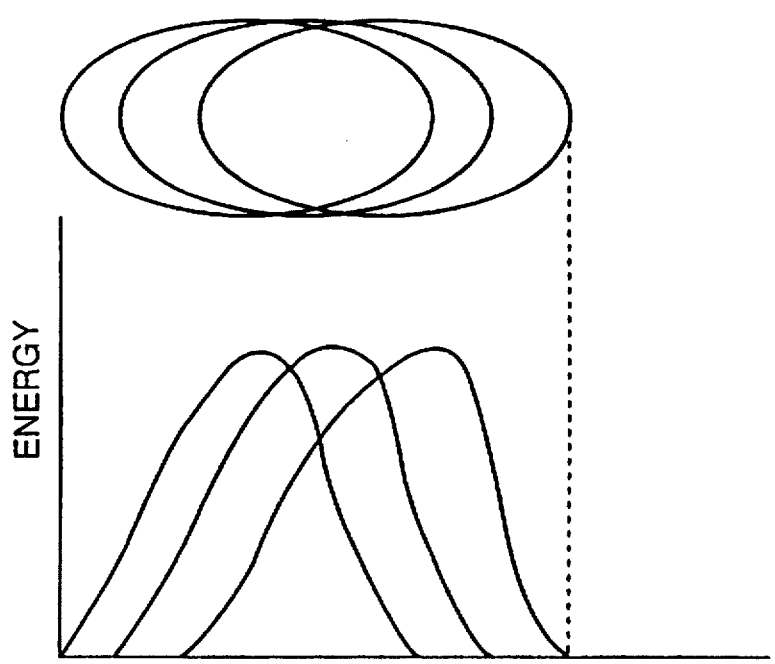
FIG. 2 shows three overlapping spots 3, 5, and 7 generated by three different beams of radiation from a narrow line width imaging source (not shown). Energy versus distance along the scan line for the three spots is also shown.

The present invention describes a process for the exposure of photothermographic silver halide based media using narrow beam radiation. Narrow beams of raiation are used to provide spot exposures on the photothermographic media to generate latent images which are thermally developed. These narrow beams expose spots on the media (e.g., less than 600 micrometers Full Width Half Maximum (FWHM) spots in Graphic Arts, prefereably less than 500 micrometers FWHM and less than 250 micrometers Full Width Half Maximum spots, preferably less than 300 or less than 220 and more preferably less than 150 micrometers in medical imaging) and when the area of these spots overlaps the area of other spots as described herein, increased film speed, contrast, and image quality can be provided to the image produced on the photothermographic media.

The media used in the present invention comprises photothermographic media based upon silver source reduction phenomena. Photothermographic systems are well known in the imaging art and generally comprise a binder, silver halide (or silver halide progenitor) light-insensitive or less light-sensitive silver source, and reducing agent for silver ion. The photothermographic imaging media contains silver halide (either ab initio or generated in the film by heating or other treatment).

The photothermographic emulsions of this invention may be constructed of one or more layers on a substrate. Single layer constructions must contain the silver source material, the silver halide, the developer and binder as well as optional additional materials such as toners, coating aids, and other adjuvants. Two-layer constructions must contain the silver source and silver halide in one emulsion layer (usually the layer adjacent to the substrate) and some of the other ingredients in the second layer or both layers, although two layer constructions comprising a single emulsion layer containing all the ingredients and a protective topcoat are envisioned. Multicolor photothermographic constructions may contain sets of these bilayers for each color, or they may contain all ingredients within a single layer as described in U.S. Pat. No. 4,708,928. In the case of multilayer multicolor photothermographic articles the various emulsion layers are generally maintained distinct from each other by the use of functional or non-functional barrier layers between the various photosensitive layers as described in U.S. Pat. No. 4,460,681.

While not necessary for practice of the present invention, it may be advantageous to add mercury (II) salts to the emulsion layer(s) as an antifoggant. Preferred mercury (II) salts for this purpose are mercuric acetate and mercuric bromide.

The light sensitive silver halide used in the present invention may typically be employed in a range of 0.75 to 25 mol percent and, preferably, from 2 to 20 mol percent of organic silver salt.

The silver halide may be any photosensitive silver halide such as silver bromide, silver iodide, silver chloride, silver bromoiodide, silver chlorobromoiodide, silver chlorobromide, etc. The silver halide may be in any form which is photosensitive including, but not limited to cubic, orthorhombic, tabular, tetrahedral, etc., and may have epitaxial growth of crystals thereon.

The silver halide used in the present invention may be employed without modification. However, it may be chemically sensitized with a chemical sensitizing agent such as a compound containing sulfur, selenium or tellurium etc., or a compound containing gold, platinum, palladium, rhodium or iridium, etc., a reducing agent such as a tin halide, etc., or a combination thereof. The details of these procedures are described in T. H. James "The Theory of the Photographic Process", Fourth Edition, Chapter 5, pages 149 to 169.

The silver halide may be added to the emulsion layer in any fashion which places it in catalytic proximity to the silver source. Silver halide and the organic silver salt which are separately formed or "preformed" in a binder can be mixed prior to use to prepare a coating solution, but it is also effective to blend both of them in a ball mill for a long period of time. Further, it is effective to use a process which comprises adding a halogen-containing compound in the organic silver salt prepared to partially convert the silver of the organic silver salt to silver halide.

Methods of preparing these silver halide and organic silver salts and manners of blending them are known in the art and described in *Research Disclosure*, June 1978, item 17029, and U.S. Pat. No. 3,700,458.

The use of preformed silver halide emulsions of this invention can be unwashed or washed to remove soluble salts. In the latter case the soluble salts can be removed by chill-setting and leaching or the emulsion can be coagulation washed, e.g., by the procedures described in U.S. Pat. Nos. 2,618,556; 2,614,928; 2,565,418; 3,241,969; and 2,489,341. The silver halide grains may have any crystalline habit including, but not limited to cubic, tetrahedral, orthorhombic, tabular, laminar, platelet, etc.

The organic silver salt may be any organic material which contains a reducible source of silver ions. Silver salts of organic acids, particularly long chain (10 to 30 preferably 15 to 28 carbon atoms) fatty carboxylic acids are preferred. Complexes of organic or inorganic silver salts wherein the ligand has a gross stability constant between 4.0 and 10.0 are also desirable. The silver source material should preferably constitute from about 5 to 30 percent by weight of the imaging layer.

The organic silver salt which can be used in the present invention is a silver salt which is comparatively stable to light, but forms a silver image when heated to 80° C. or higher in the presence of an exposed photocatalyst (such as photographic silver halide) and a reducing agent.

Preferred organic silver salts include silver salts of organic compounds having a carboxy group. Non-limiting examples thereof include silver salts of an aliphatic carboxylic acid and a silver salt of an aromatic carboxylic acid. Preferred examples of the silver salts of aliphatic carboxylic acids include silver behenate, silver stearate, silver oleate, silver laurate, silver caproate, silver myristate, silver palmitate, silver maleate, silver fumarate, silver tartrate, silver linoleate, silver butyrate and silver camphorate, mixtures thereof, etc. Silver salts with a halogen atom or a hydroxyl on the aliphatic carboxylic acid can also be effectively used. Preferred examples of the silver salts of aromatic carboxylic acids and other carboxyl group-containing compounds include silver benzoate, a silver substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenyl benzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663, etc.

Silver salts of compounds containing mercapto or thione groups and derivatives thereof can also be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(ethylglycolamido) benzothiazole, a silver salt of thioglycolic acid such as a silver salt of an S-alkyl thioglycolic acid (wherein the alkyl group has from 12 to 22 carbon atoms), a silver salt of a dithiocarboxylic acid such as a silver salt of dithioacetic acid, a silver salt of a thioamide, a silver salt of 5-carboxylic-1-methyl-2-phenyl-4-thiopyridine, a silver salt of mercaptotriazine, a silver salt of 2-mercaptobenzoxazole, a silver salt as described in U.S. Pat. No. 4,123,274, for example, a silver salt of 1,2,4-mercaptotriazole derivative such as a silver salt of 3-amino-5-benzylthio-1,2,4-triazole, a silver salt of a thione compound such as a silver salt of 3-(2-carboxyethyl)-4-methyl-4-thiazoline-2-thione as disclosed in U.S. Pat. No. 3,301,678.

Furthermore, a silver salt of a compound containing an imino group may be used. Preferred examples of these compounds include silver salts of benzotriazole and derivatives thereof, for example, silver salts of benzotriazoles such as silver methylbenzotriazolate, etc., silver salt of halogen-substituted benzotriazoles, such as silver 5-chlorobenzotriazolate, etc., silver salts of carboimidobenzotriazole, etc., silver salt of 1,2,4-triazoles or 1-H-tetrazoles as described in U.S. Pat. No. 4,220,709, silver salts of imidazoles and imidazole derivatives, and the like. Various silver acetylide compounds can also be used, for instance, as described in U.S. Pat. Nos. 4,761,361 and 4,775,613.

It is also found convenient to use silver half soaps, of which an equimolar blend of silver behenate and behenic acid, prepared by precipitation from aqueous solution of the sodium salt of commercial 35 behenic acid and analyzing about 14.5 percent silver, represents a preferred example. Transparent sheet materials made on transparent film backing require a transparent coating and for this purpose the silver behenate full soap, containing not more than about four or five percent of free behenic acid and analyzing about 25.2 percent silver may be used.

The method used for making silver soap dispersions is well known in the art and is disclosed in *Research Disclosure*, April 1983, item 22812, *Research Disclosure*, October 1983, item 23419 and U.S. Pat. No. 3,985,565.

The light-sensitive silver halides may be advantageously spectrally sensitized with various known dyes including cyanine, merocyanine, styryl, hemicyanine, oxonol, hemioxonol and xanthene dyes. Useful cyanine dyes include those having a basic nucleus, such as a thiazoline nucleus, an oxazoline nucleus, a pyrroline nucleus, a pyridine nucleus, an oxazole nucleus, a thiazole nucleus, a selenazole nucleus and an imidazole nucleus. Useful merocyanine dyes which are preferred include those having not only the above described basic nuclei but also acid nuclei, such as a thiohydantoin nucleus, a rhodanine nucleus, an oxazolidinedione nucleus, a thiazolidinedione nucleus, a barbituric acid nucleus, a thiazolinone nucleus, a malononitrile nucleus and a pyrazolone nucleus. In the above described cyanine and merocyanine dyes, those having imino groups or carboxyl groups are particularly effective. Practically, the sensitizing dyes to be used in the present invention may be properly selected from known dyes such as those described in U.S. Pat. Nos. 3,761,279, 3,719,495, and 3,877,943, British Pat. Nos. 1,466,201, 1,469,117 and 1,422,057, and can be located in the vicinity of the photocatalyst according to known methods. Spectral sensitizing dyes may be typically used in amounts of about $10^{-4}$ mol to about 1 mol per 1 mol of silver halide.

The reducing agent for the organic silver salt may be any material, preferably organic material, that can reduce silver ion to metallic silver. Conventional photographic developers such as phenidone, hydroquinones, and catechol are useful but hindered phenol reducing agents are preferred. The reducing agent should be present as 1 to 10 percent by weight of the imaging layer. In multilayer constructions, if the reducing agent is added to a layer other than an emulsion layer, slightly higher proportions, of from about 2 to 15 percent tend to be more desirable.

A wide range of reducing agents have been disclosed in dry silver systems including amidoximes such as phenylamidoxime, 2-thienylamidoxime and p-phenoxyphenylamidoxime, azines (e.g., 4-hydroxy-3,5-dimethoxybenzaldehydeazine); a combination of aliphatic carboxylic acid aryl hydrazides and ascorbic acid, such as 2,2'-bis(hydroxymethyl)propionyl-β-phenylhydrazide in combination with ascorbic acid; a combination of polyhydroxybenzene and hydroxylamine, a reductone and/or a hydrazine (e.g., a combination of hydroquinone and bis (ethoxyethyl)hydroxylamine, piperidinohexose reductone or formyl-4-methylphenylhydrazine); hydroxamic acids such as phenylhydroxamic acid, p-hydroxyphenylhydroxamic acid, and β-alaninehydroxamic acid; a combination of azines and sulfonamidophenols, (e.g., phenothiazine and 2,6-dichloro-4-benzenesulfonamidophenol); α-cyanophenylacetic acid derivatives such as ethyl-α-cyano-2-methylphenylacetate, ethyl α-cyanophenylacetate; bis-β-naphthols as illustrated by 2,2'-dihydroxyl-1-binaphthyl, 6,6'-dibromo-2,2'-dihydroxy-1,1'-binaphthyl, and bis(2-hydroxy-1-naphthyl)methane; a combination of bis-β-naphthol and a 1,3-dihydroxybenzene derivative, (e.g., 2,4-dihydroxybenzophenone or 2,4-dihydroxyacetophenone); 5-pyrazolones such as 3-methyl-1-phenyl-5-pyrazolone; reductones as illustrated by dimethylaminohexose reductone, anhydrodihydroaminohexose reductone, and anhydrodihydropiperidonehexose reductone; sulfonamido-phenol reducing agents such as 2,6-dichloro-4-benzenesulfonamidophenol, and p-benzenesulfonamidophenol; 2-phenylindane-1,3-dione and the like; chromans such as 2,2-dimethyl-7-t-butyl-6-hydroxychroman; 1,4-dihydropyridines such as 2,6-dimethoxy-3,5-dicarboethoxy-1,4-dihydropyridine; bisphenols (e.g., bis(2-hydroxy-3-t-butyl-5-methylphenyl) methane, 2,2-bis(4-hydroxy-3-methylphenyl)propane, 4,4-ethylidene-bis(2-t-butyl-6-methylphenol), and 2,2-bis(3,5-dimethyl-4-hydroxyphenyl)propane); ascorbic acid derivatives (e.g., 1-ascorbyl palmitate, ascorbyl stearate); and unsaturated aldehydes and ketones, such as benzil and biacetyl; 3-pyrazolidones and certain indane-1,3-diones.

In addition to the aforementioned ingredients, it may be advantageous to include additives known as "toners" that improve the image. Toner materials may be present, for example, in amounts from 0.1 to 10 percent by weight of all silver bearing components. Toners are well known materials in the photothermographic art as shown in U.S. Pat. Nos. 3,080,254; 3,847,612 and 4,123,282.

Examples of toners include phthalimide and N-hydroxyphthalimide; cyclic imides such as succinimide, pyrazoline-5-ones, and a quinazolinone, 3-phenyl-2-pyrazoline-5-one, 1-phenylurazole, quinazoline, and 2,4-thiazolidinedione; naphthalimides (e.g., N-hydroxy-1,8-naphthalimide); cobalt complexes (e.g., cobaltic hexammine trifluoroacetate); mercaptans as illustrated by 3-mercapto-1, 2,4-triazole, 2,4-dimercaptopyrimidine, 3-mercapto-4,5-diphenyl-1,2,4-triazole and 2,5-dimercapto-1,3,4-thiadiazole; N-(aminomethyl)aryldicarboximides, (e.g., (N,N-dimethylaminomethyl)phthalimide, and N,N-(dimethylaminomethyl)naphthalene-2,3-dicarboximide); and a combination of blocked pyrazoles, isothiuronium derivatives and certain photobleaching agents (e.g., a combination of N, N'-hexamethylene bis(1-carbamoyl-3,5-dimethylpyrazole), 1,8-(3,6-diazaoctane)bis(isothiuronium trifluoroacetate) and 2-(tribromomethylsulfonyl) benzothiazole); and merocyanine dyes such as 3-ethyl-5|(3-ethyl-2-benzothiazolinylidene)-1-methylethylidene|-2-thio-2,4-oxazolidinedione; phthalazinone and phthalazinone derivatives or metal salts or these derivatives such as 4-(1-naphthyl)phthalazinone, 6-chlorophthalazinone, 5,7-dimethoxyphthalazinone, and 2,3-dihydro-1,4-phthalazinedione; a combination of phthalazinone plus sulfinic acid derivatives (e.g., phthalic acid, 4-methylphthalic acid, 4-nitrophthalic acid, and tetrachlorophthalic anhydride); quinazolinediones, benzoxazine or naphthoxazine derivatives; rhodium complexes functioning not only as tone modifiers, but also as sources of halide ion for silver halide formation in situ, such as ammonium hexachlororhodate (III), rhodium bromide, rhodium nitrate and potassium hexachlororhodate (III); inorganic peroxides and persulfates (e.g., ammonium peroxydisulfate and hydrogen peroxide); benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidines and asymmetric triazines (e.g., 2,4-dihydroxypyrimidine, 2-hydroxy-4-aminopyrimidine), azauracils, and tetrazapentalene derivatives (e.g. 3,6-dimercapto-1,4-diphenyl-1H, 4H-2,3a,5,6a-tetrazapentalene, and 1,4-di(o-chlorophenyl)-3,6-dimercapto-1H,4H-2,3a,5,6a-tetrazapentalene).

A number of methods are known in the art for obtaining color images with dry silver systems including: a combination of silver benzotriazole, well known magenta, yellow and cyan dye-forming couplers, aminophenol developing agents, a base release agent such as guanidinium trichloroacetate and silver bromide in poly(vinyl butyral) as described in U.S. Pat. Nos. 4,847,188 and 5,064,742; preformed dye release systems such as those described in U.S. Pat. No. 4,678,739; a combination of silver bromoiodide, sulfonamidophenol reducing agent, silver behenate, poly (vinyl butyral), an amine such as n-octadecylamine and 2-equivalent or 4-equivalent cyan, magenta or yellow dye-forming couplers; leuco dye bases which oxidize to form a dye image (e.g., Malachite Green, Crystal Violet and pararosaniline); a combination of in situ silver halide, silver behenate, 3-methyl-1-phenylpyrazolone and N,N'-dimethyl-p-phenylenediamine hydrochloride; incorporating phenolic leuco dye reducing agents such as 2(3,5-di-(t-butyl)-4-hydroxyphenyl)-4,5-diphenylimidazole, and bis(3,5-di-(t-butyl)-4-hydroxyphenyl)phenylmethane, incorporating azomethine dyes or azo dye reducing agents; silver dye bleach processes (for example, an element comprising silver behenate, behenic acid, poly(vinyl butyral), poly(vinyl-butyral)peptized silver bromoiodide emulsion, 2,6-dichloro- 4-benzenesulfonamidophenol, 1,8-(3,6-diazaoctane)bis (isothiuronium-p-toluenesulfonate) and an azo dye can be exposed and heat processed to obtain a negative silver image with a uniform distribution of dye, and then laminated to an acid activator sheet comprising polyacrylic acid, thiourea and p-toluenesulfonic acid and heated to obtain well defined positive dye images); and amines such as aminoacetanilide (yellow dye-forming), 3,3'-dimethoxybenzidine (blue dye-forming) or sulfanilide (magenta dye forming) that react with the oxidized form of incorporated reducing agents such as 2,6-dichloro-4-benzenesulfonamidophenol to form dye images. Neutral dye images can be obtained by the addition of amines such as behenylamine and p-anisidine.

Leuco dye oxidation in such silver halide systems for color formation is disclosed in U.S. Pat. Nos. 4,021,240, 4,374,821, 4,460,681 and 4,883,747.

Emulsions of the invention can contain plasticizers and lubricants such as polyalcohols (e.g., glycerin and diols of the type described in U.S. Pat. No. 2,960,404); fatty acids or esters such as those described in U.S. Pat. No. 2,588,765 and U.S. Pat. No. 3,121,060; and silicone resins such as those described in British Pat. No. 955,061.

The emulsions of the present invention may contain additional stabilizers and antifoggants known in the photothermographic art. These may be primary stabilizers and antifoggants or post-processing stabilizers. Amongst the preferred antifoggants are organic compounds having trihalogented and especially tribromomethyl groups. These are often aryl(aromatic) nuclei having the halogenated group either directly attached to the aromatic nucleus or attached through a bridging group (e.g., sulfonyl). Other useful antifoggants include isocyanates, vinyl sulfones, and beta-halogenated sulfones.

The photothermographic elements of the present invention may include image dye stabilizers. Such image dye stabilizers are illustrated by British Pat. No. 1,326,889; U.S. Pat. Nos. 3,432,300; 3,698,909; 3,574,627; 3,573,050; 3,764,337 and 4,042,394.

Photothermographic elements containing emulsion layers according to the present invention can be used in photographic elements which contain light absorbing materials and filter dyes such as those described in U.S. Pat. Nos. 3,253,921; 2,274,782; 2,527,583 and 2,956,879. If desired, the dyes can be mordanted, for example, as described in U.S. Pat. No. 3,282,699. Antihalation layers are particularly useful in scanned exposure elements. These layers are well known in the art and comprise a radiation absorbing material (matched to or including absorption of the imaging radiation) in a binder, usually below the emulsion layer, but sometimes above the emulsion layer, between the emulsion layer and the base, or behind the base.

Photothermographic elements containing emulsion layers as described herein can contain matting agents such as starch, titanium dioxide, zinc oxide, silica, polymeric beads including beads of the type described in U.S. Pat. No. 2,992,101 and U.S. Pat. No. 2,701,245.

Emulsions in accordance with this invention can be used in photothermographic elements which contain antistatic or conducting layers, such as layers that comprise soluble salts (e.g., chlorides, nitrates, etc.), evaporated metal layers, ionic polymers such as those described in U.S. Pat. Nos. 2,861,056 and 3,206,312 or insoluble inorganic salts such as those described in U.S. Pat. No. 3,428,451.

The binder may be selected from any of the well-known natural or synthetic resins such as gelatin, polyvinyl acetals, polyvinyl chloride, polyvinyl acetate, cellulose acetate, polyolefins, polyesters, polystyrene, polyacrylonitrile, polycarbonates, and the like. Copolymers and terpolymers are of course included in these definitions. The preferred photothermographic silver containing polymers are polyvinyl butyral, ethyl cellulose, methacrylate copolymers, maleic anhydride ester copolymers, polystyrene, and butadiene-styrene copolymers.

Optionally, these polymers may be used in combinations of two or more thereof. Such a polymer is used in an amount sufficient to carry the components dispersed therein, that is, within the effective range of the action as the binder. The effective range can be appropriately determined by one skilled in the art. As a guide in the case of carrying at least an organic silver salt, it can be said that a preferable ratio of the binder to the organic silver salt ranges from 15:1 to 1:2, and particularly from 8:1 to 1:1.

Photothermographic emulsions according to the present invention may be coated on a wide variety of supports. Typical supports include polyester film, subbed polyester film, poly(ethylene terephthalate)film, cellulose nitrate film, cellulose ester film, poly(vinyl acetal) film, polycarbonate film and related or resinous materials, as well as glass, paper, metal and the like. Typically, a flexible support is employed, especially a paper support, which may be partially acetylated or coated with baryta and/or an $\alpha$-olefin polymer, particularly a polymer of an $\alpha$-olefin containing 2 to 10 carbon atoms such as polyethylene, polypropylene, ethylene-butene copolymers and the like. Substrates may be transparent or opaque.

Substrates with a backside resistive heating layer may also be used in photothermographic imaging systems such as shown in U.S. Pat. Nos. 4,460,681, 4,477,562 and 4,374,921.

Photothermographic emulsions of this invention can be coated by various coating procedures including dip coating, air knife coating, curtain coating, or extrusion coating using hoppers of the type described in U.S. Pat. No. 2,681,294. If desired, two or more layers may be coated simultaneously by the procedures described in U.S. Pat. No. 2,761,791 and British Pat. No. 837,095.

Additional layers may be incorporated into photothermographic articles of the present invention such as dye receptive layers for receiving a mobile dye image, an opacifying layer when reflection prints are desired, an antihalation layer, a protective topcoat layer and a primer layer as is known in the photothermographic art. Additionally, it may be desirable in some instances to coat different emulsion layers on both sides of a transparent substrate, especially when it is desirable to isolate the imaging chemistries of the different emulsion layers. Using these types of media, optimized for the particular wavelengths of the imaging sources, the process of the present invention may be practiced.

In photothermographic media, and especially with film, the use of high frequency modulation is important in the performance of the medium because of the transparency of the film. High frequency modulation helps to reduce image artifacts. For media like dry silver (silver halide based photothermography) which require high power laser diodes and therefore high driving current, high frequency driver design and implementation are more complicated. Optimization of high frequency driver frequency may also be important to image quality requirements of dry media.

To best understand this process, it is desirable to appreciate and understand the characteristics of a coherent radiation imaging source.

The light emitted by a coherent radiation source such as a laser or a laser diode appears to be monochromatic, of fairly uniform beam width, and of somewhat consistent spot shape (from a given radiation source). However, in the reality of imaging, there are imperfections in the spot of light. The coherent light sources are effectively turned on and off for each spot or pulse to be generated.

Additionally, the light spot is not usually moved from point to point, with the radiation source "off" when the direction of the imaging source is moved. The source may move steadily and the radiation turned on and off as the spot is moved along the focal plane. This can give the spot an appearance other than the emitted shape from the source, and the energy distribution within the spot is not idealized (that is, it is more Gaussian than uniform throughout the area of the spot). The advantages of using a monochromatic radiation source are well known in the art.

The movement of the scan, in combination with the energy gradient driving the imager will also cause a distribution of energy within a spot. Perpendicular to the direction of the fast scan (at the top and bottom of a horizontally moving spot) and along the direction of movement there will be a lower energy at the trailing edge of a spot (the first edge of a spot generated by a pulse) and the leading edge of a spot (the last edge of a spot generated during a pulse) as compared to the physical or statistical center of a spot. In addition to the limitations of speed and other sensitometry imposed upon image quality by photothermographic imaging systems, these variations in radiation sources do not naturally combine to form a high quality imaging system with coherent radiation exposed photothermographic imaging media.

The normal exposure time or dwell time of a pixel (which may comprise a number of spots within an ordered pattern or array) is often on the order of 0.1 (e.g., 0.01 to 1) microseconds. The dwell time (pulse rate) for the pixels is usually between 0.02 and 10 microseconds in imaging media, the larger numbers indicating a less preferred slow imaging system where lower powered impulses may be used because of the needs of a particular imaging system. In the practice of the present invention a pixel rate of 0.03 to 6 is preferred, 0.05 to 5 more preferred, and 0.08 to 3 most preferred to take maximum advantage of the practice of the present invention. Of course, as improvements in media, coherent light sources, spectral absorbers, hardware, software, and the like become commercially available, this range could well shift. The pixel exposure time is dependent upon the speed of the spot as it moves along the focal plane. The spot velocity is usually between 1 and 1000 meters/sec. The various characteristics of the pulse and imaging process are generally related as the higher the output of the coherent radiation source, the shorter need be the pixel exposure time and the faster may be the spot velocity. These relationships are not as fixed in the practice of the present invention, because lower power output from the coherent light source can be used with shorter pixel exposure times (on a per pulse and additive pulse basis), and the spot velocity becomes merely a physically limiting parameter of the process rather than a necessarily critical sensitometric parameter. Even though the spot velocity affects the sensitometry somewhat, the process of the present invention, with the overlap of exposing dots tends to reduce some of the sensitometric problems associated with higher spot velocity imaging.

There is some theoretic consideration that the spacing between the time in which overlapping spots impact the media may have some implications upon the observed speed and contrast enhancing phenomena of the present invention. It has been suggested that at least 100 microseconds might be desirable as the minimum spacing between overlapping spots, but there has as yet been no physical evidence of any such effect or need. Overlaps have been successfuly used with sixty seconds between overlapping exposures, and no theory or evidence has as yet suggested the need for an upper limit.

The power output of the coherent light source generally should be able to provide an impulse of at least 600 ergs/cm$^2$ at the focal plane of the imaging device from one (usually) or more light sources (e.g., point sources such as a laser or laser diode). At the present level of technology, the radiation source should be between at least 400 ergs/cm$^2$ up to about 4000 ergs/cm$^2$. A preferred range for energy output would be between about 600 to 3000 ergs/cm$^2$ per impulse at the focal plane of the imaging device. The spots are generated from the diode by providing a current (e.g., multiple continuous or single pulses) to the diode which corresponds to the data or by providing a high frequency modulation to the diode in addition to the diode current corresponding to the data. The latter is a preferred approach to improving image quality. This means that the coherent light source must be operable at a substantially higher frequency of at least 100 MHz in addition to the data coming at 1 to 20 MHz. Modulation of the high frequency signal is typically equal to or greater than 100%. Modulation is defined as the ratio of the difference between the laser diode current and threshold current to the high frequency modulation current. Modulation current of the high frequency source can remain fixed or made to vary with the laser diode current, but still maintaining the modulation depth requirement described above. It is important that the high frequency modulation provide an increase in line width, for example from 0.1 nm without modulation to $\geq 2$ nm with superimposed high frequency modulation.

The systems of the present invention, although essentially digital in nature can produce continuous tone images. With at least 64, more preferably at least 128, and more preferably at least 256 or at least 512 steps per grey scale, high quality images which are continuous tone to the naked eye can be produced.

It has been found that, given a desired measurable density in the data for a point within image data, a sharper image, of desired density can be obtained by a scanning of the media from any coherent, highly focused, or narrow beam width radiation source (hereinafter generally refered to as "coherent radiation source") by scanning in which at least two spots overlap to provide an exposure within a single point of information within a pixel. It is preferred that the degree of overlap should be sufficient to have at least ten percent of one of the areas of exposure by a single spot overlapped by at least ten percent of the energy of the overlapping spot. Increasing amounts of overlap (e.g., fifteen percent, twenty percent, twenty-five percent, thirty percent (this is a preferred minimum), thirty-five percent, forty percent, forty-five percent, fifty percent (this is a more preferred minimum), etc., in 5% intervals up to 100%, corresponding to multiple exposure) can provide additional improvements and reduce energy requirements as compared to a single higher powered exposure. Note that 100% overlap of spots may also be defined as multiple exposures according to the present invention. With higher (than two) multiple exposing pulses, that is exposures in which the leading edge of one spot lies within the energy distribution exposure curve of multiple (two, three, four, five, six, eight, ten or more) spots, the total energy focused on an area to produce a given density is less for the multiple exposures than for a single high energy pulse. Additionally there can be measurable and observable image improvements (such as sharpness and reduced flare) in using the multiple exposures.

Figure 3A:
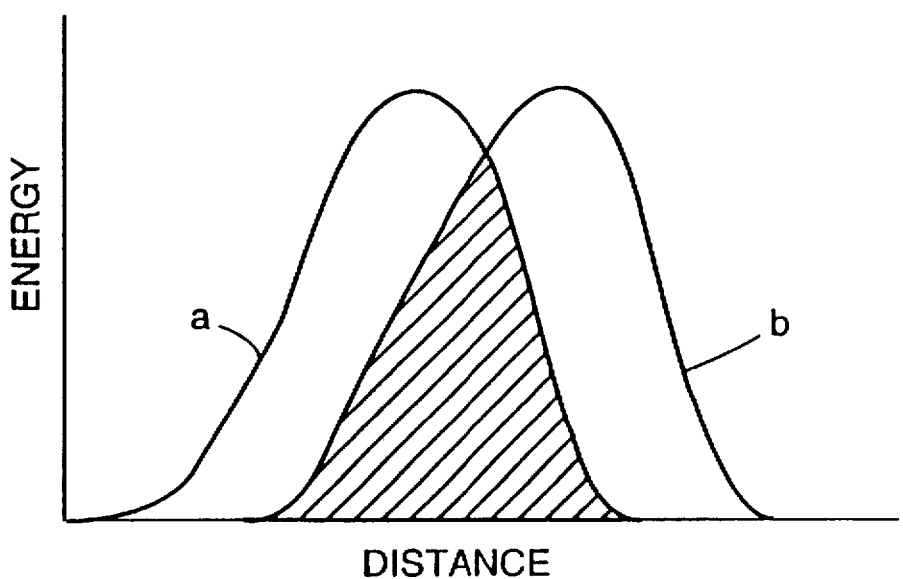
FIG. 3 shows two graphs of two theoretic spot overlaps (3A) and six theoretic spot overlays (3B).

FIG. 3A shows two theoretic curves for two overlapping spots (a) and (b). The shaded area is the energy striking the photothermographic element within one spot (a or b) which is within the energy distribution curve of the other spot (b or a, respectively). The percentage of overlap can be readily estimated or calculated by determining the percentage area which the shaded area represents with respect to the total area under either of the curves. When the total energy of each curve a and b is the same, the percentage overlap will be the same when calculated for either spot. Only if the spots a and b were of different total energy contents would the percentages be different.

Figure 3B:
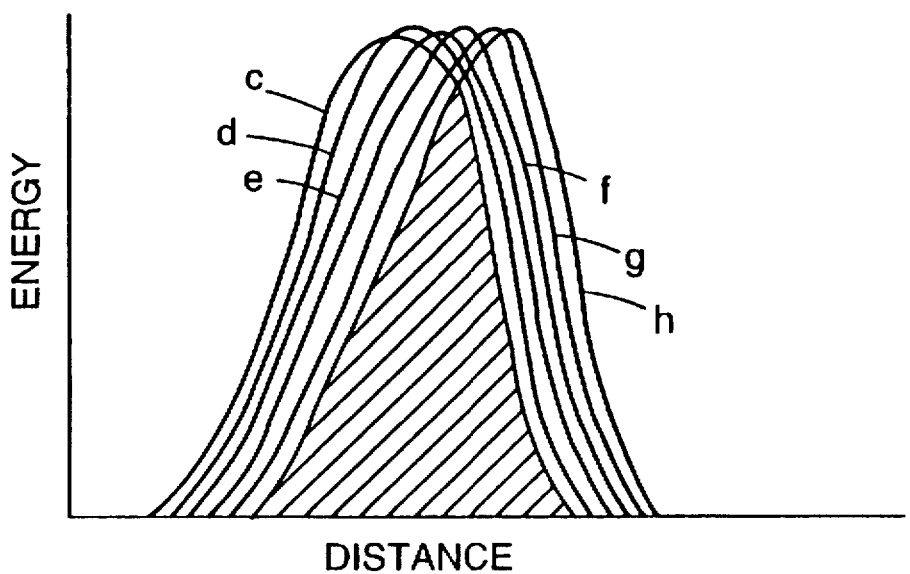

Looking at FIG. 3B, there are six theoretic overlapping spots, c, d, e, f, g, and h. For all six of the spots to be considered as overlapping, the last energy curve for the last spot (h) must overlap each of the other curves by the required minimum amount. The shaded area shown in FIG. 5B is the overlap between curve (h) and curve (c). That shaded area also would normally be the minimum overlap of curve (h) with respect to any other curve in the sextuple overlap system or configuration.

Another technique for analyzing the degree of overlap between spots is to consider the overlap factor. The overlap factor can be defined as follows:

OVERLAP FACTOR ($F_o$)=LASER SPOT SIZE ($L_s$)/SCAN LINE SEPARATION IN THE SLOW SCAN DIRECTION ($S_s$)

$F_o = L_s/S_s$

Figure 4:
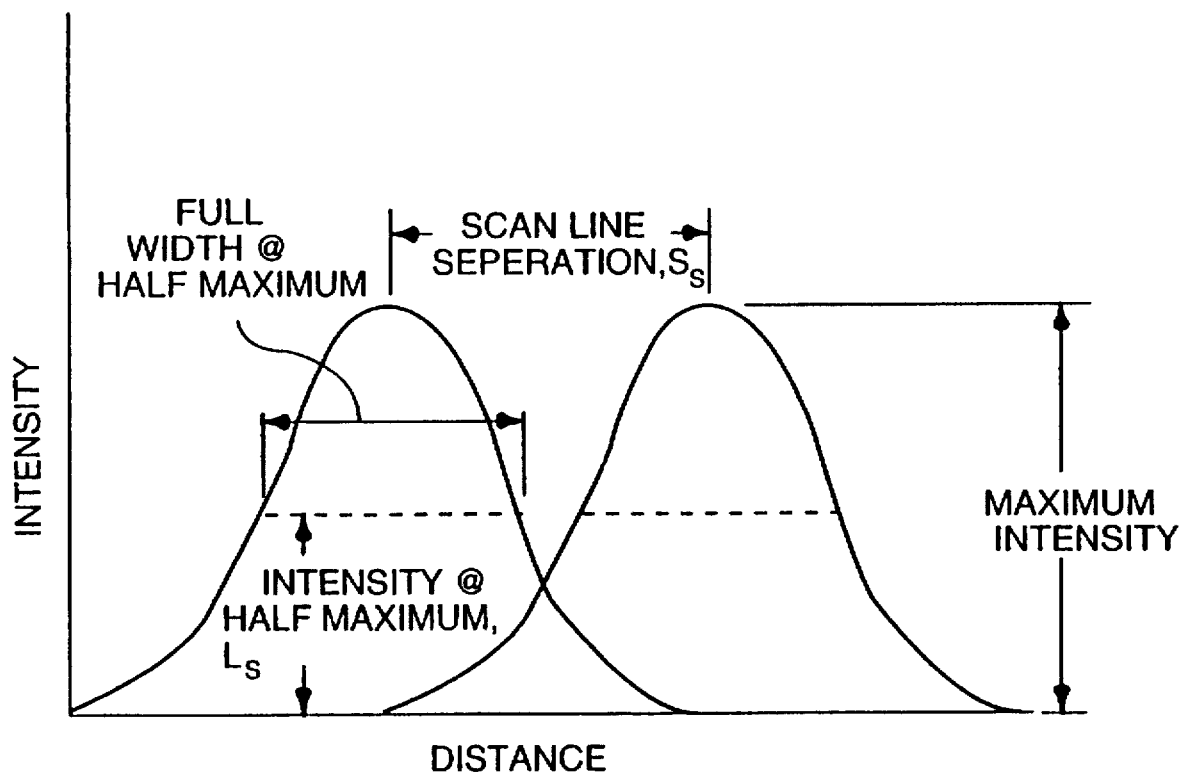
FIG. 4 shows intensity versus distance along the slow scan direction for two overlapping spots. Full Width at Half Maximum (FWHM) of the laser spot and the scan line separation of the two spots are also shown.

The laser spot size is measured as the Full Width Half Maximum Dimension (FWHM), and the Scan Line Separation in the Slow Scan Direction ($S_s$) is measured as the distance between peaks of overlapping spots. These features are shown in FIG. 4.

It is estimated that an overlap factor of at least 0.30, preferably at least 0.40, more preferably at least 0.50, and most preferably at least 0.60 is desirable in obtaining benefits according to the practice of the present invention with Gaussian distributions of the enrgy. Values of at least 0.70, 0.80, 0.90, and 1.0 (multiple exposure) are also very desirable levels for the overlap factor. Below an overlap factor of about 0.30 (except that with non-Gaussian distributions, overlap factors of 0.1 can be useful), the power saving/image enhancing effects of the present invention are minimal, although still observable in some cases. Even below overlap factors of 0.45, where the energy effects are clearly and consistently observable, there are some imaging effects which may be adverse to certain imaging standards. For example, at these intermediate values of the overlap factor (e.g., between 0.30 and 0.45) the effective total energy per area resulting from the summation of the individual overlapping spot exposures may have a wavy appearance. This uneven effective Emax function could cause image artifacts, equivalent to raster lines. Some of these artifacts have actually been observed at lower overlap factor scanning.

The phenomenon discovered in the practice of the present invention whereby the total summation of impulse energy within a pixel necessary to produce a given $D_{max}$ at an approximately constant image contrast (at least maintaining contrast within nominal ranges, e.g., 1.0 to 6.0 or 2.0 to 5.0, for example) decreases with multiple exposures as compared to a single pulse exposure, is not typically known in the use of multiple scanning of images in wet processed silver halide photographic elements. In mathematical terms this may be expressed in terms of the number of pulses (N) which overlap within a physical area or pixel on the focal plane of the media, each pulse having a total impulse energy ($E_i$) at the focal plane, the product of the number of pulses and the total impulse energy/per pulse is less than the exposure energy ($E_{exp}$) for a single exposure spot at constant optical density. Given a fixed optical density for the image (e.g., for a particular pixel) and given a contrast held within a nominal range for continuous tone imaging (e.g., between 1.0 and 6.0, preferably between 2.0 and 5.0), the following relationship exists for the practice of the present invention:

$N_{(multiple\ exposure)} \times E_i < E_{exp}$

That is, the total energy of exposure within a pixel at a fixed optical density (e.g., 1.0 at a contrast between 1.0 and 6.0) is less when multiple exposures are used within that pixel than when a single exposure (single pulse) is used. Using arbitrary values for the purpose of further explaining this effect, if a single exposure (i.e., N=1) of 5000 ergs/cm$^2$ were used to produce a pixel having an optical density of 1.0 at a contrast of 3.0, the use of five overlapping exposures would require individual energy exposures of less than 1000 ergs/cm$^2$ (e.g., 800 ergs/cm$^2$) to produce an optical density of 1.0 at the same approximate level of contrast.

If the total energy impacting the media within a spot or pixel having a predetermined optical density (e.g., 1.0) were measured for an image produced by a single pulse or, for example, six overlapping pulses, the energy of each exposure would have to be less than one-sixth the energy of the single pulse. In many instances, the image quality of the multiply exposed spot or pixel would be measurably improved.

These and other aspects of the present invention will be further described and enabled in the following, non-limiting examples.

As the name implies, the exposure of the film is done in a sequence of n-steps with each step corresponding to 1/n of the total exposure or less. As an illustration, let us consider a media to be exposed at P mW of total power. This can be done by exposing the film once with P mW, twice with less than or equal to P/2 mW, three times with less than or equal to P/3 mW and so on. Since the pixel dwell time is unaltered, the total exposure (ergs/cm2) at the film plane under multiple exposure will be equal to or less than the single exposure value. It is also useful to provide different power levels for each spot used in the multiple exposure or multiple overlap techniques of the present invention.

EXAMPLE 1

Figure 5:
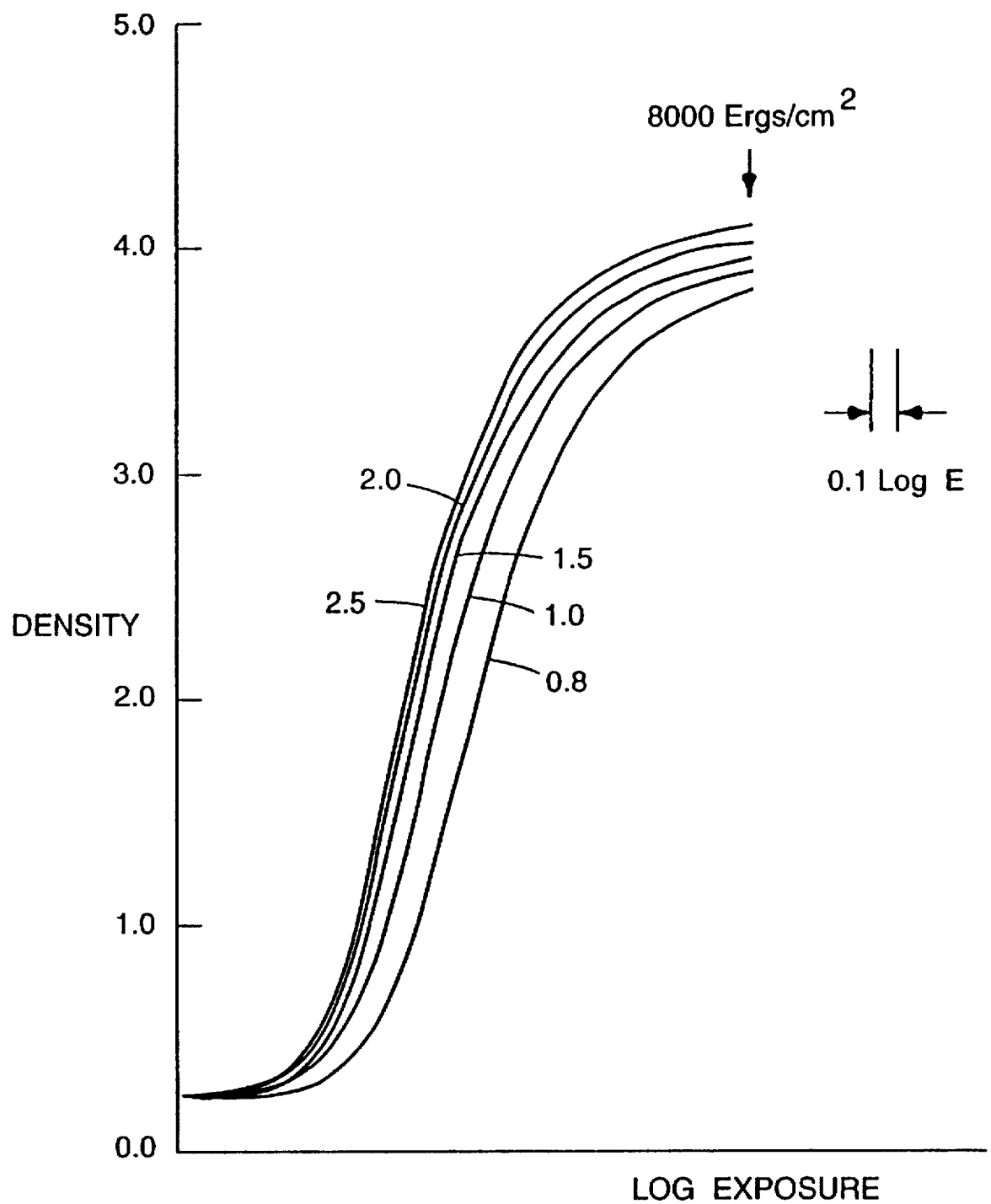
FIG. 5 shows Density versus logE (exposure) of a photothermographic film element (Film 1, not shown) with overlap factors varying from 0.8 to 2.5.
Figure 6:
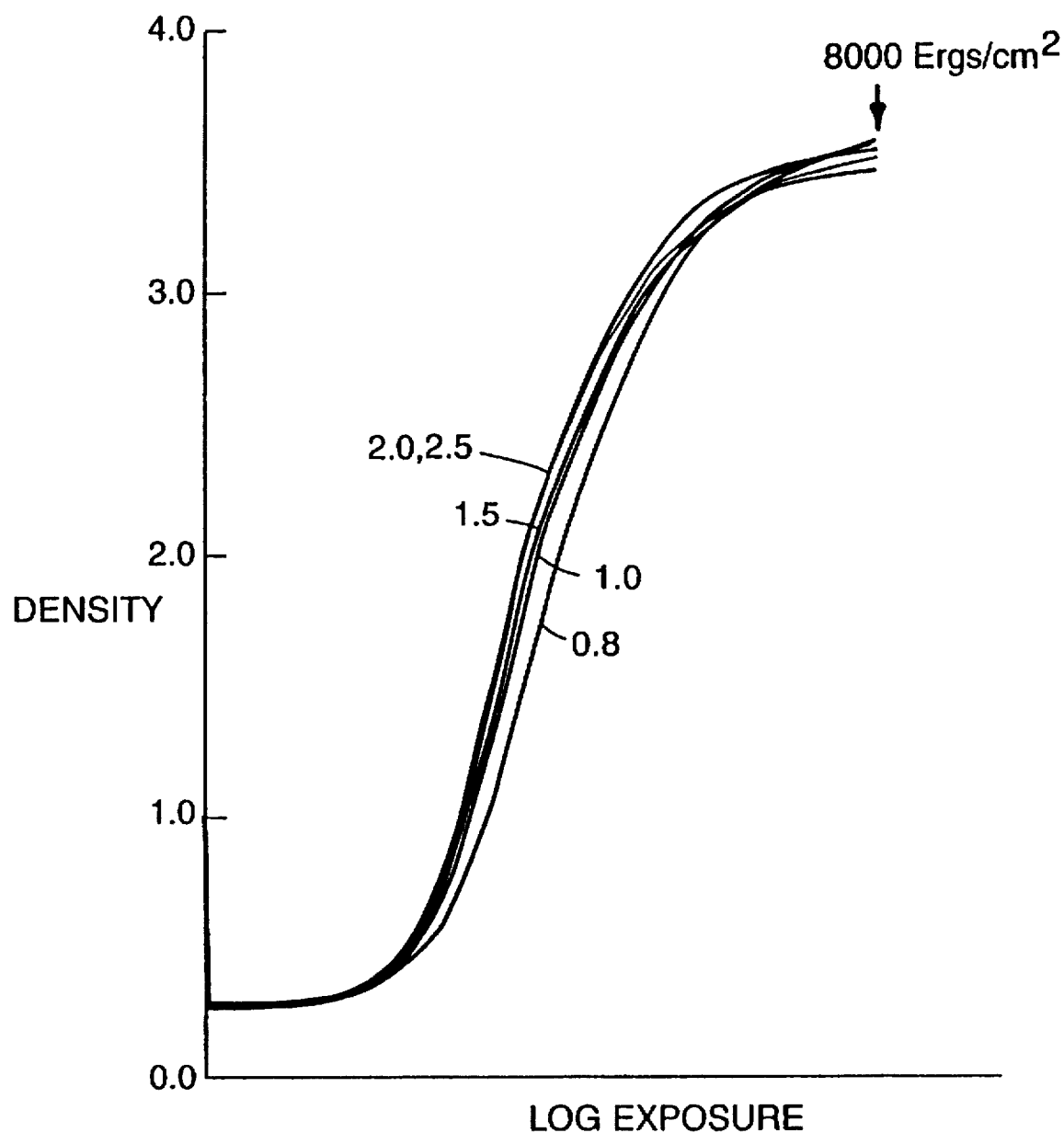
FIG. 6 shows a graph of Density versus logE for a photothermographic film element (Film 2, not shown) with overlap factors varying from 0.8 to 2.5.

Variation of overlap factor and its effect on the sensitometric properties of photothermographic films was done on a 3LS laser sensitometer which incorporates an 811 nm wavelength laser diode described in further detail below. After exposure, the photothermographic film was developed at 250 degrees Fahrenheit for fifteen seconds. The sensitometer used a two-dimensional scanning engine (2D). A resonant galvonometer was used for the fast scan and a linear galvonometer was used for the slow scan. The spot size was 163 μm in the fast scan direction (horizontal) and 59 μm in the slow scan direction (vertical). The resonant galvonometer frequency was 309 Hz. Spot overlap was varied by changing the linear galvonometer velocity. In order to keep the exposure constant, the input power at the film plane was adjusted with the change in the spot overlap or linear galvo velocity. Overlap factors of 0.8, 1.0, 1.5, 2.0 and 2.5 were used in the reported experiments. D-Log E (E=ergs/cm2) characteristics of two different photothermographic films, Film 1 (#84-10-05) and Film 2 (#84-10-08) for various spot over.lap factors are shown in FIG. 5 and in FIG. 6 respectively. Note the change in the speed and contrast of Film 1 by varying the overlap factor from 0.8 to 2.5. For example, Speed2 (1.0+Dmin) changes from 234 ergs/cm² at an overlap factor of 1.0 to 170 ergs/cm² at an overlap factor of 2.5 and contrast changes from 4.02 to 4.33. On the other hand, Speed2 changes from 288 ergs/cm² to 251 ergs/cm² for Film 2 by changing overlap from 1.0 to 2.5. The contrast changes from 3.45 to 3.70. Although not fully understood, this implies sensitivity enhancement relies upon the film's emulsion characteristics.

Figure 7:
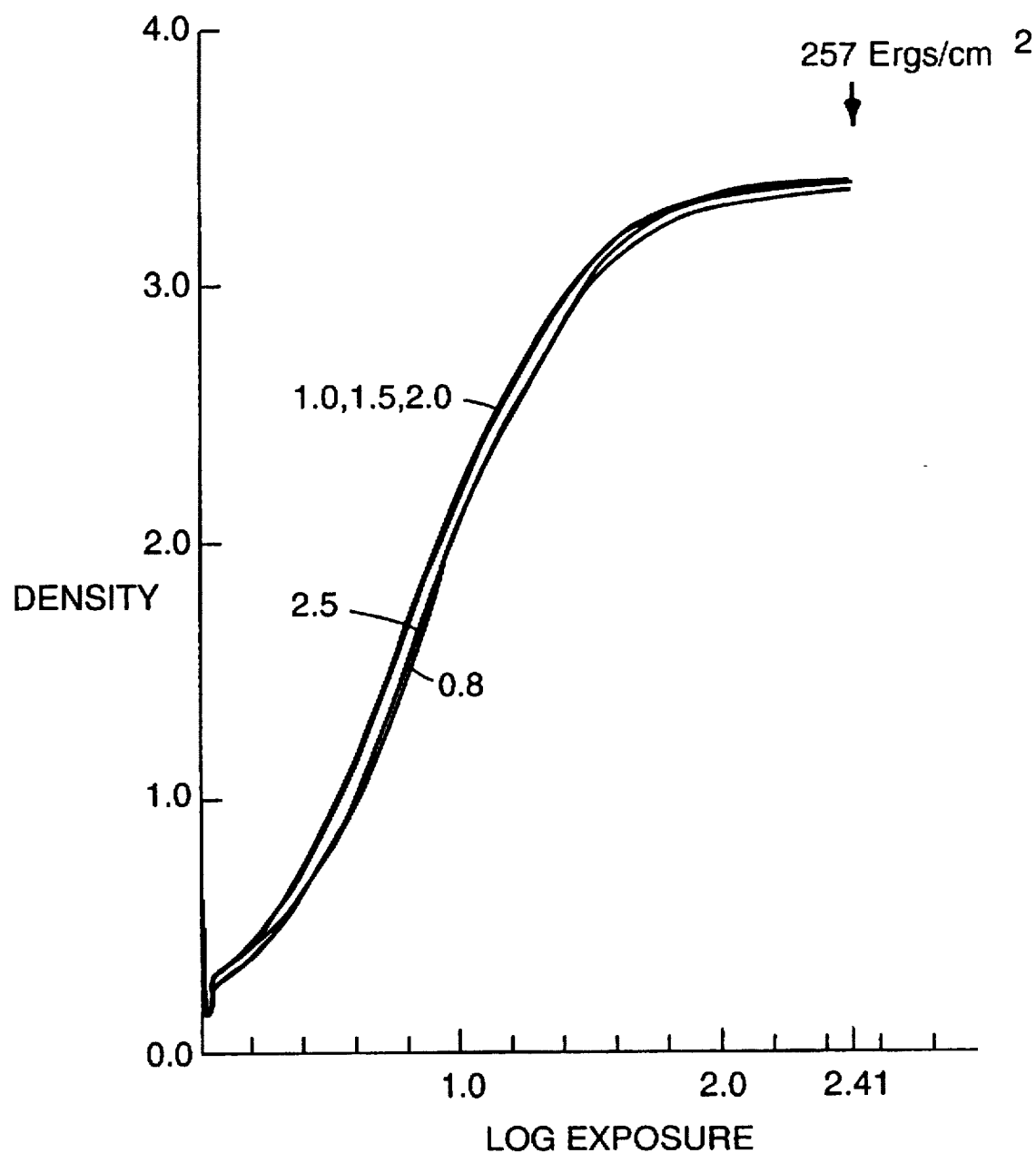
FIG. 7 is a graph which shows Density versus logE of a conventional wet processed silver halide film, IRB+ film, with overlap factors varying from 0.8 to 2.5.
Figure 12:
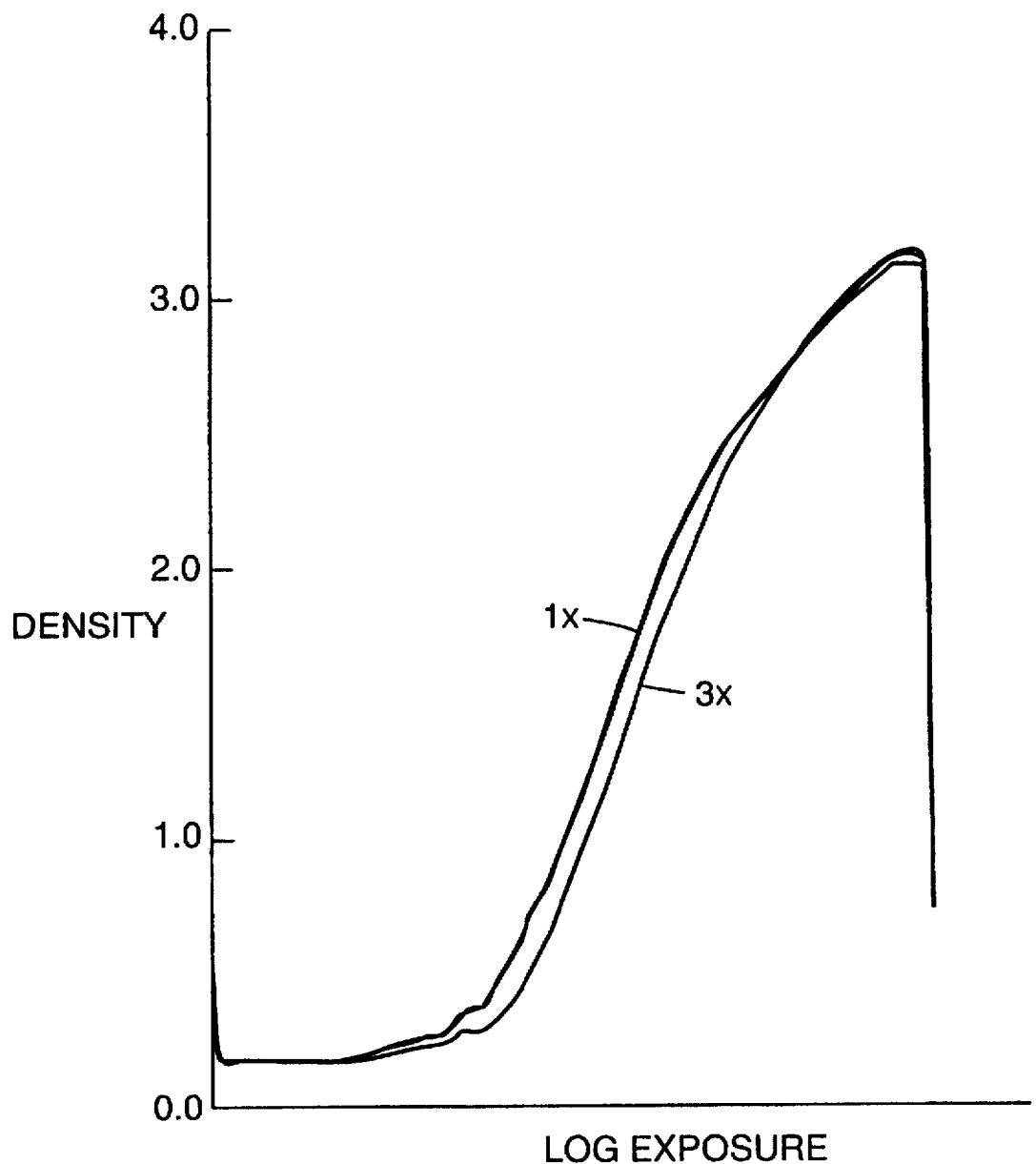
FIG. 12 shows a graph of Density versus logE for a wet processed commercial silver halide photographic element (IRB+ film) subjected to single and triple exposure conditions.

In order to establish a baseline, IRB+ film (Commercially available black-and-white, infrared sensitive wet processed photographic film) was exposed in the 3LS laser sensitometer with overlap factors varying from 0.8 to 2.5 similar to the dry silver films. The results have been plotted in FIG. 7. Single and triple exposure of the IRB+ film in this laser are shown in FIG. 12. Note that the overlap factor had very little effect on the sensitometric characteristics of IRB+ film. In fact there was a slight drop in speed and small change in contrast at the highest overlap factor (2.5) used in these experiments.

Figure 8:
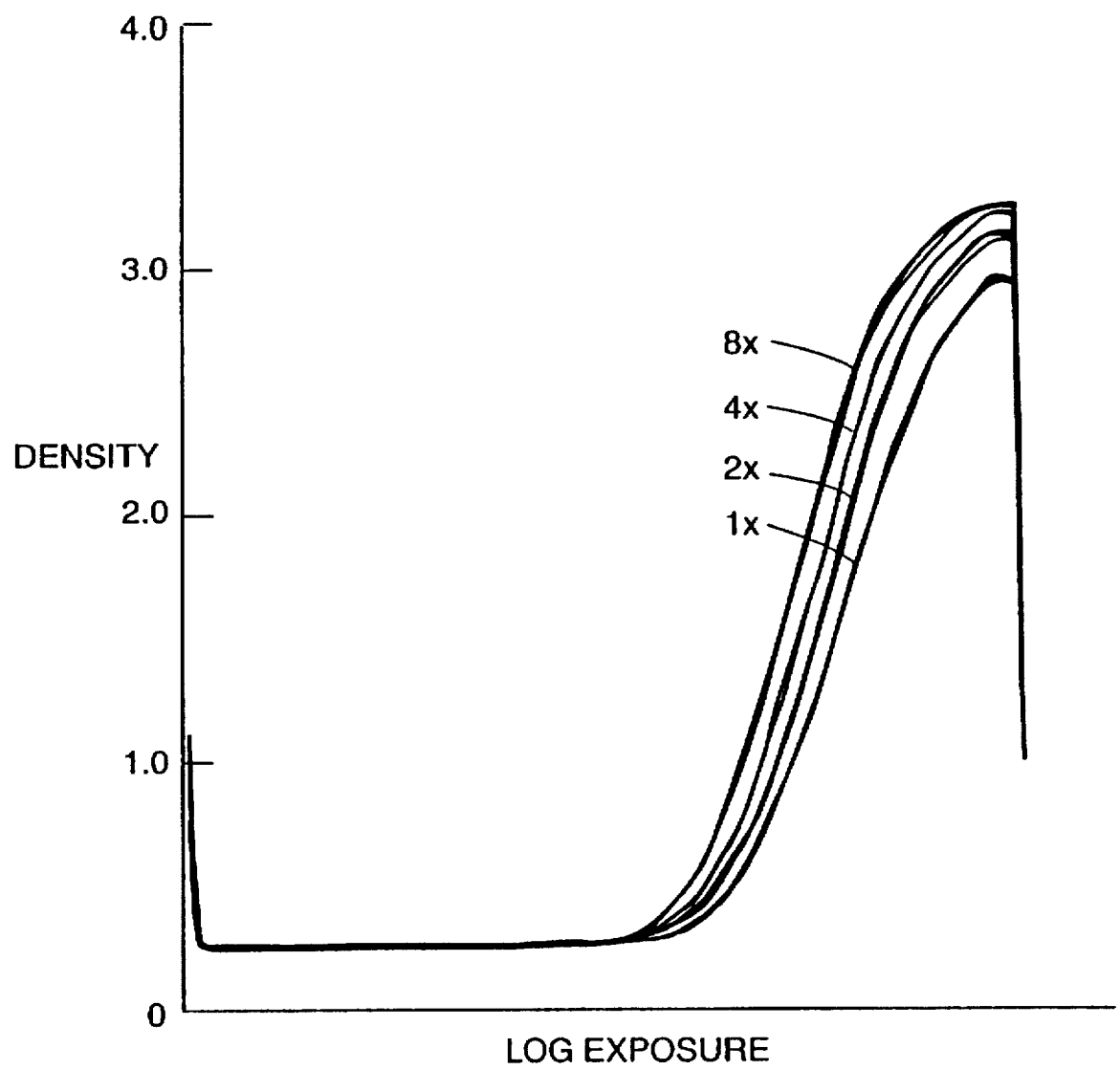
FIG. 8 shows a graph of density versus logE for a photothermographic film element (Film 3), not shown) subjected to multiple exposures (1, 2, 4, and 8×). 2× corresponds to 2×(½ single exposure), 4× corresponds to 4×(¼ single exposure), etc.
Figure 9:
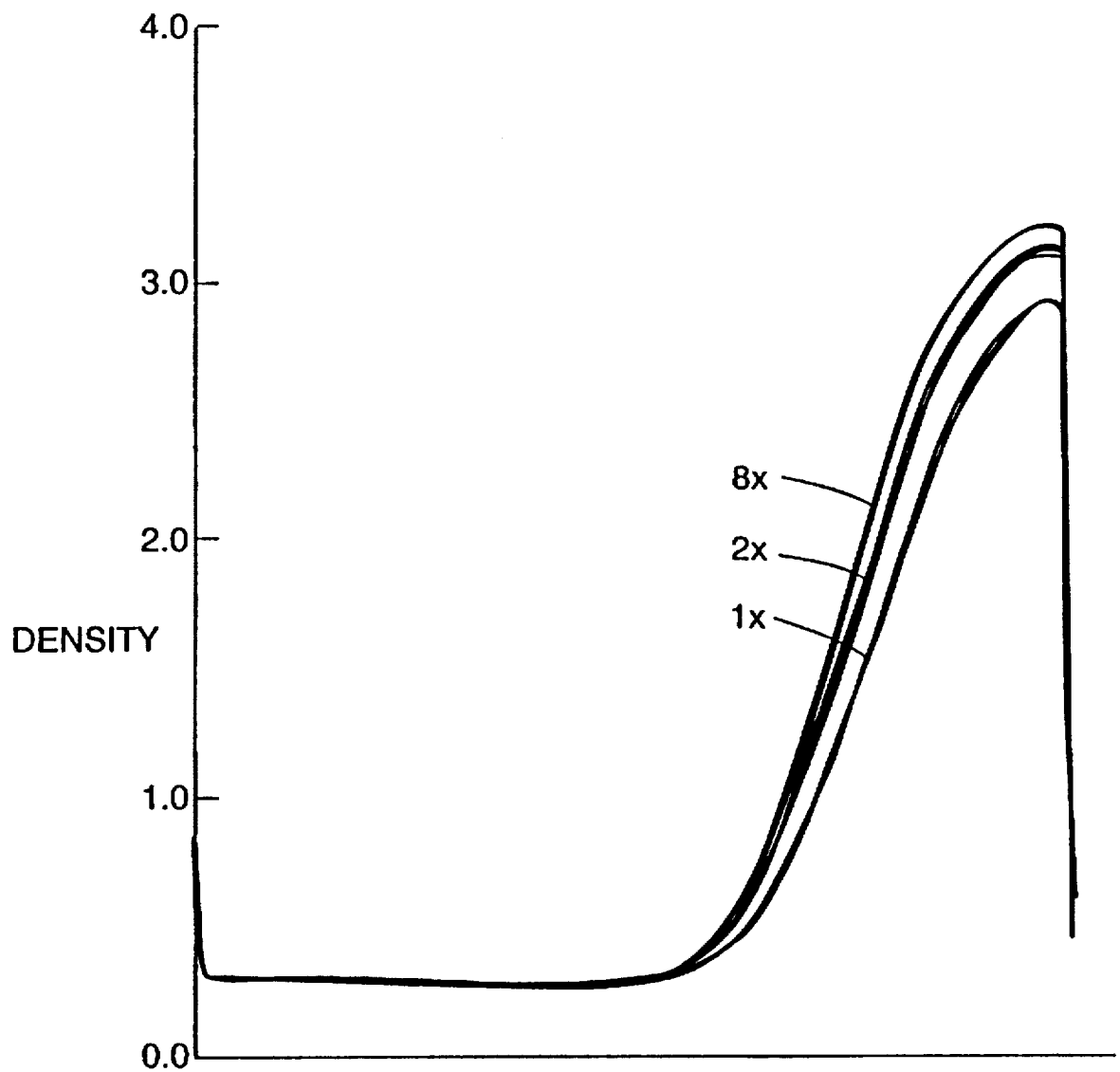
FIG. 9 shows Density versus logE of a photothermographic film element (Film 4, not shown) subjected to multiple exposures (1, 2, and 4×).

Multiple exposure experiments:

A 2D laser imager (a two-dimensional laser scanner as herein described) was used in the following multiple exposure experiments. The 2D laser imager consisted of a resonant galvonometer for the fast scan direction and a linear galvonometer for the slow scan direction. The laser diode used in this imager had an emission wavelength of 807 nm. The overlap factor in this laser imager was 1.2. Photothermographic films were exposed in the laser imager through an electronically generated pattern consisting of 50 equal Log E steps. After exposure, the photothermographic films were developed with a thermal processor (comprising a heated drum and a plurality of rollers) at a temperature of 250° F. Density measurements were done by a computer densitometer. D-Log E characteristics of several photothermographic film elements (Films 3 and 4, which are both IR sensitive elements similar in construction and composition to film 5, but having some less preferred aspects) are shown in FIGS. 8 and 9 respectively. The results show sensitivity enhancement through multiple exposure. It should also be noted that speed and contrast are both affected through multiple exposure similar to the overlap factor effects mentioned earlier. It should also be mentioned that degree of sensitivity enhancement is not the same in all photothermographic films.

Figure 10:
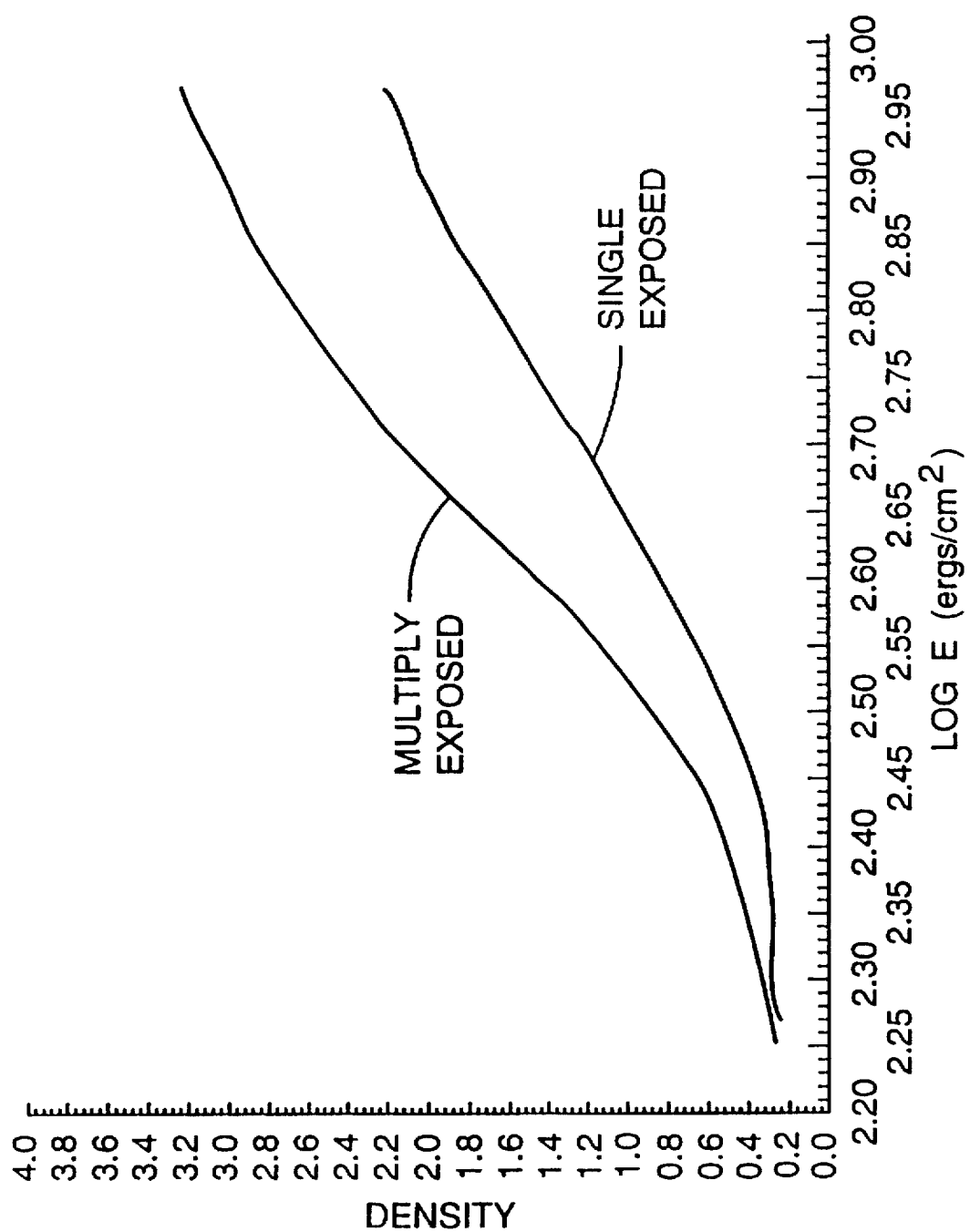
FIG. 10 shows a graph of Density versus logE for a photothermographic film element (Film 1, not shown) subjected to single and multiple exposures up to 5×. 5× corresponds to 5×(⅕ single exposure), etc.

In a somewhat different experiment, Film 1 was exposed to give a uniform grey using multiple exposures. Processed film densities as a function of exposure for single and multiple exposed films are plotted in FIG. 10. The results show sensitivity enhancement in the multiple exposure experiments.

Figure 11:
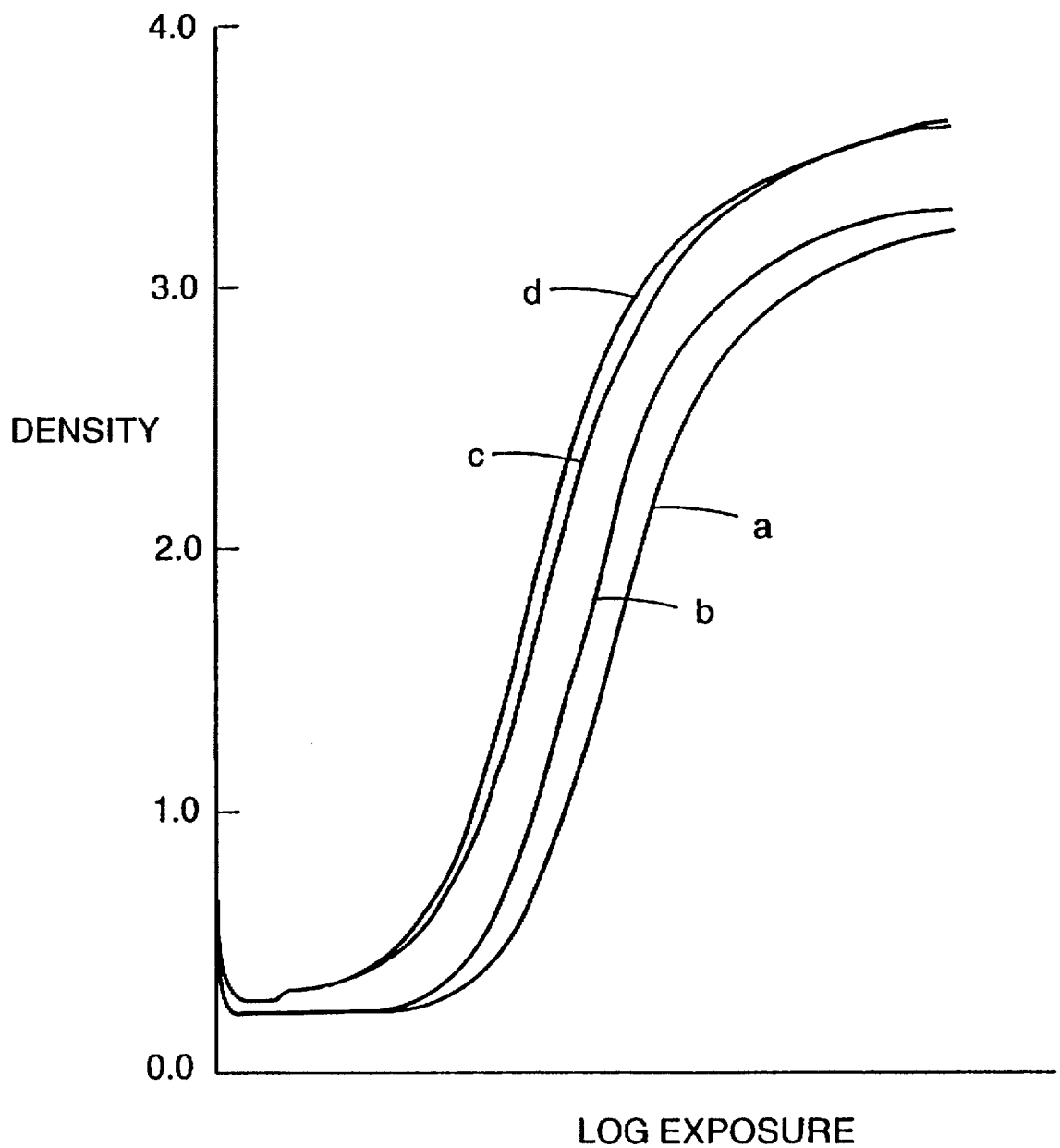
FIG. 11 shows a graph of Density versus logE for two different photothermographic film elements (Films 2 and 4) under single and double exposure conditions. a and b correspond to single and double exposures on Film 2, respectively, with double exposure corresponding to two exposures, each at one-half the intensity of a single exposure. c and d correspondingly represent graphing for single and double exposures for Film 6.

Some additional multiple exposure experiments on Film 2 and Film 4 dry silver films were done in the 3LS laser sensitometer described earlier. The overlap factor was set at 2.5. D-Log E characteristics of these films at single and double exposures (at ½ the single exposure intensity) are reported in the FIG. 11. Again note the enhancement in sensitivity and contrast in the multiply exposed films compared to the single exposure film.

Single and triple exposure of the IRB+ film in this laser are shown in FIG. 12. For the triple-exposed IRB+ film there was a slight drop in speed and a 0.1 increase in contrast. This is noteworthy at least because the use of multiple scanning in wet processed photographic media is shown to provide no benefit in speed increase and a commercially insignificant increase in contrast increase as opposed to what is found with multiple scanning or overlap scanning on photothermographic media according to the practice of the present invention, even though both systems rely upon silver halide as the photosensitive ingredient. The decrease in speed and commercially insignificant increase in contrast noted in the photographic medium is not highly adverse or advantageous, but repeated experiments have shown that result to be reproducible and measurable.

EXAMPLE 3

A silver halide-silver behenate half soap was prepared by the procedure described in U.S. Pat. No. 3,839,049. The silver halide totalled 9% of the total silver, while silver behenate comprised 91% of the total silver. The silver halide was a 0.055 micron silver bromoiodide emulsion with 2% iodide.

A photothermographic emulsion was prepared by homogenizing 455 grams of the silver halide-silver behenate dry soap described above with 27 grams toluene, 1918 grams 2-butanone, and 48 grams poly(vinylbutyral) (B-79, Monsanto).

The homogenized photothermographic emulsion (698 grams) and 60 grams of 2-butanone were cooled to 55° F. with stirring. Pyridinium hydrobromide perbromide (0.92 grams) was added and stirred for two hours. The addition of 3.25 ml of a calcium bromide solution (1 gram of $CaBr_2$ and 10 ml of methanol) was followed by thirty minutes stirring. Additional poly(vinylbutyral) (158 grams B-79) was added and stirred for twenty minutes. The temperature was raised to 70° F. and the following were added at 15 minute intervals with stirring:

3.42 grams 2-(tribromomethylsulfone)quinoline 28.1 grams 1,1-bis(2-hydroxy-3,5-dimethylphenyl)-3,5,5-trimethylhexane 41.1 grams of solution containing 0.545 grams 5-methylmercaptobenzimidazole 6.12 grams 2-(4-chlorobenzoyl)benzoic acid, 0.104 grams S-1 (sensitizing dye) and 34.3 grams methanol 2.14 grams isocyanate (Desmodur N3300, Mobay)

0.97 grams tetrachlorophthalic anhydride 2.88 grams phthlalazine

Dye S-1 has the structure

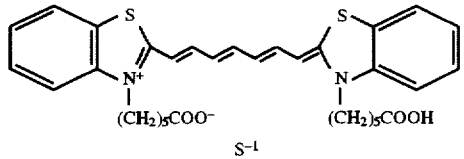

An active, protective topcoat solution was prepared with the following ingredients:

80.0 grams 2-butanone 10.7 grams methanol 8.0 grams cellulose acetate butyrate (CAB-171-155, Eastman Chemicals)

0.52 grams 4-methylphthalic acid 0.80 grams MRA-1, mottle reducing agent, a tertiary polymer of N-ethylperfluorooctane sulfonyl amidoethyl methacrylate/hydroxyethyl methacrylate/acrylic acid in a weight ratio of 70/20/10

The photothermographic emulsion and topcoat were coated simultaneously on 7 mil (0.18 mm) blue polyester base. A knife coater was set up with two simultaneous coating bars or knives separated by a six inch distance (14.24 cm). Both the silver trip layer and the top coat were multilayer coated by pouring the silver emulsion on the film prior to the rear knife and pouring the top coat on the film prior to the front bar. The film was then drawn forward so that both layers are coated simultaneously. This resulted in a single pass, multilayer coating method. The coated polyester base was dried at 175° F. for four minutes. The knives were adjusted to give dry coating weights of 23 grams per meter square for the silver layer and 2.4 grams per meter square for the top coat.

The photothermographic media described immediately above (Film 5) were multiply exposed in the imager with an image pattern which consisted of dark and clear bar patterns of various spatial frequencies such as 0.61, 1.53, 2, 3 and 6 lines/mm. Microdensitometry was used to evaluate the sharpness transfer function (STF) of these bar patterns. STF is defined as (Dmax−Dmin)/(Dmax+Dmin) where Dmax refers to the maximum density in solid line and Dmin refers to the minimum density of the clear area. STF as a function of spatial frequency has been plotted in FIG. 13 and the data summarized in Table 1 below. STF increase from ~0.42 to 0.7 at 6 lines/mm when the number of exposures was increased from 1 to 10. This implies an improvement in image sharpness of dry silver photothermographic media with multiple exposures.

Figure 14B:
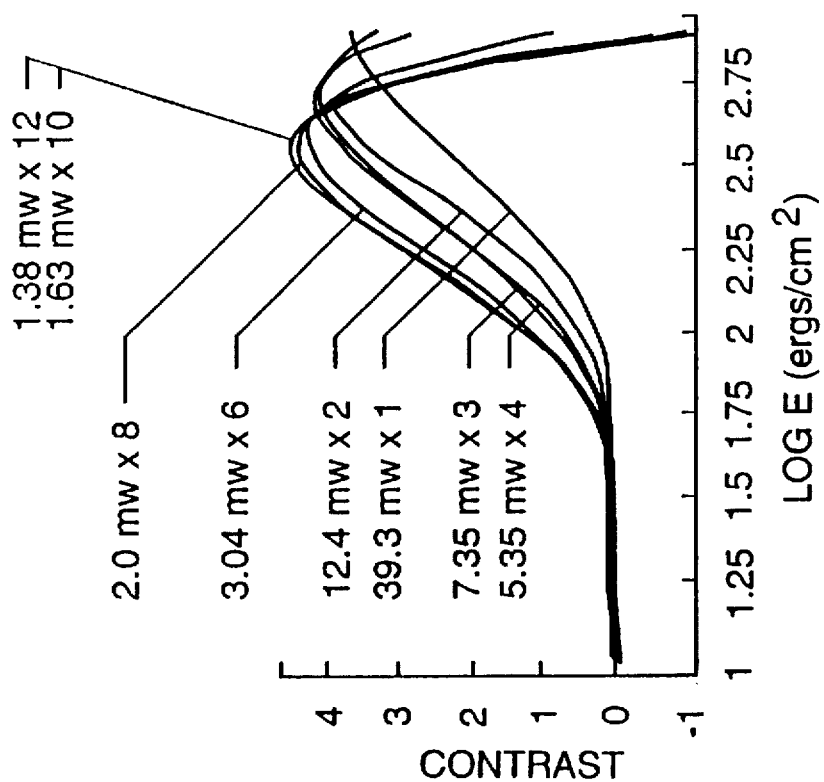
FIG. 14B shows local contrast as a function of logE for the same photothermographic film element as FIG. 14A for various exposure conditions.
Figure 14A:
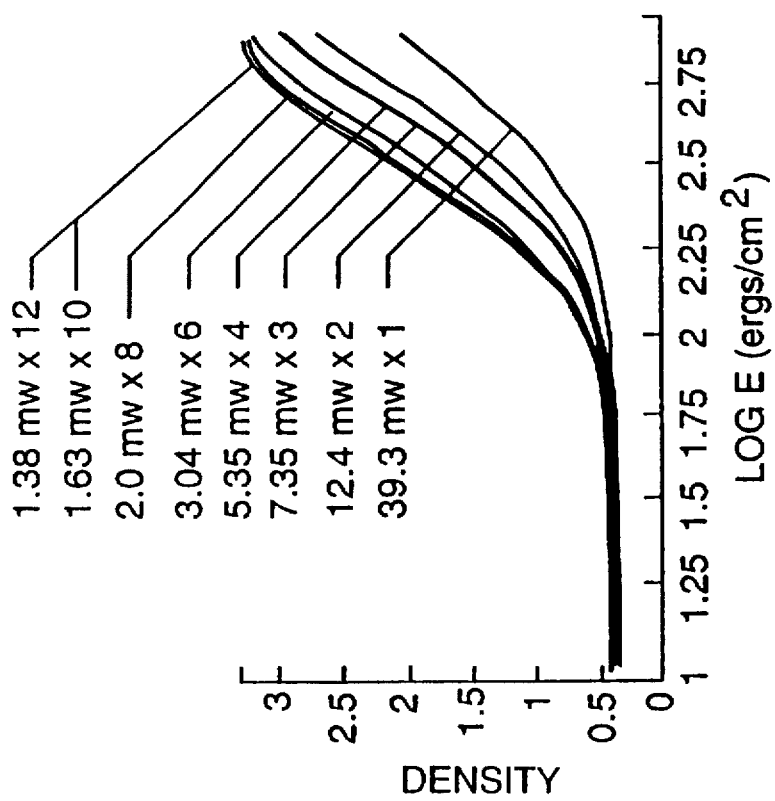
FIG. 14A shows a graph of Density versus logE for a photothermographic film element (Film 5) subjected to multiple exposures.

The same photothermographic media (Film 5) was multiply exposed in the laser imager with an image pattern which consisted of a density step wedge. Density (D) as a function of the Log Exposure (Log E) was measured of these step wedges. These results are plotted in FIG. 14A. Note that a given density is reached at a lower exposure when the exposure is given in small dosage but a multiple number of times. Local contrast was calculated by taking the derivative of the D versus LogE data. These results (contrast vs. Log E) are shown in FIG. 14B. An improvement in contrast is observed at a lower exposure for the media exposed a multiple number of times compared to the singly exposed media.

System Implication:

Multiple exposure or multiple overlap to improve the sensitivity of photothermographic media can be implemented in a laser imager. Such an imager with 2D scanning uses a resonant galvonometer for the X-axis and a linear galvonometer for the Y-axis or sub-scan direction. Such scanning systems are well known in the prior art (SPIE, Vol. 1454, p257, 1991). Many other configurations using scanners and optics are possible. In a typical example, the resonant galvonometer is a counter rotating scanner (CRS) oscillating at 705 Hz. The scanner in the Y-direction is a linear galvonometer. Operationally, the CRS galvonometer scans each line three times with the same data. At the end of the third scan for each line, the linear galvonometer advances to the next line and the scan sequence is repeated. This is equivalent to the multiple exposure approach discussed earlier.

The multiple overlap approach can be implemented by controlling the spot size commensurate with the scan line separation and desired overlap and continuous rotation of the sub-scan galvonometer. In both methods of operation, the total exposure time for a given film will be same as for a resonant galvonometer operating at 235 Hz with single exposure per scan line. Thus the throughput remains the same with an added advantage of film sensitivity enhancement.

An alternate approach for multiple overlap is to use multiple laser spots simultaneously. Three laser spots are used as an example. Each of the laser spots can represent part of a single pixel. The three pixels are generated by advancing each of the spots through a fixed distance to create the required overlap. The advantage of such a scheme is to increase the system throughput by parallel addressing of multiple pixels. As data is printed multiple times, suitable data interpolation can be taken advantage of to improve image quality.

TABLE 1

|  | Spatial Frequency (l/mm) | | | | |
| --- | --- | --- | --- | --- | --- |
|  | 0.61 | 1.53 | 2 | 3 | 6 |
| 1 × 39.3 mW | 0.773316 | 0.730425 | 0.686952 | 0.622828 | 0.42411 |
| 2 × 12.4 mW | 0.800607 | 0.785151 | 0.768009 | 0.734677 | 0.589336 |
| 3 × 7.35 mW | 0.812862 | 0.798053 | 0.789636 | 0.761704 | 0.616774 |
| 4 × 5.35 mW | 0.822317 | 0.809028 | 0.800432 | 0.779049 | 0.627171 |
| 6 × 3.04 mW | 0.823081 | 0.811295 | 0.807981 | 0.789466 | 0.66324 |
| 8 × 2.0 m/W | 0.820646 | 0.811292 | 0.806132 | 0.792235 | 0.686388 |
| 10 × 1.63 mW | 0.814089 | 0.815721 | 0.809362 | 0.796096 | 0.700456 |
| 12 × 1.38 mW | 0.819927 | 0.815401 | 0.815297 | 0.798021 | 0.702207 |

In FIG. 13, the individual curves are denoted by the number of exposures shown in the Table (e.g., 1×).

What we claim is:

1. A method for increasing the sharpness of an image being formed on a black-and-white photothermographic element comprising the steps of:
    providing a black-and-white photothermographic element;
    forming a first plurality of spots on the black-and-white photothermographic element by exposing the element with a first beam of radiation, wherein the first plurality of spots have a maximum density; and
    forming a second plurality of spots on the element by exposing the element with a second beam of radiation such that at least some of the spots of the second plurality of spots overlap with some of the spots of the first plurality of spots,
    wherein the first plurality of spots and the second plurality of spots form an image having a maximum density substantially equal to the maximum density of the first plurality of spots, and further wherein a sharpness of the formed image is greater than a sharpness of the first plurality of spots.

2. The process of claim 1 wherein the first beam of radiation and the second beam of radiation are provided by a single radiation source.

3. The process of claim 1 wherein the first plurality of spots and the second plurality of spots have at least one dimension of length or width which is less than 250 micrometers.

4. The process of claim 1 wherein the first plurality of spots and the second plurality of spots have at least one dimension of length or width which is less than 150 micrometers.

5. The method of claim 1, wherein a sharpness transfer function of the image is at least 0.2 greater than a sharpness transfer function of the first plurality of spots.

6. A method of forming an image on a black-and-white photothermographic element, the image having increased sharpness, the method comprising the steps of:
    providing a radiation source which can provide a beam of radiation to a focal plane, the beam having at least one dimension which is less than 250 micrometers;

providing a black-and-white photothermographic element;

directing the radiation beam at a first energy level to form a first spot on the element, wherein the first spot has a maximum density; and directing the radiation beam at a second energy level to form a second spot on the element so that the first and second spots have an overlap factor of a least 0.30, wherein the first spot and the second spot form an image having a maximum density substantially equal to the first spot, and further wherein a sharpness transfer function of the formed image is greater than a sharpness transfer function of the first spot.

7. The method of claim 6 wherein the first and second spots have an overlap factor of at least 0.50.

8. The method of claim 6 wherein the first and second spots have an overlap factor of at least 0.70.

9. The method of claim 6 wherein the first and second spots have an overlap factor of at least 0.80.

10. The method of claim 6, further comprising the step of increasing the sharpness transfer function of the formed image by directing the radiation beam to form a third spot, wherein the first, second and third spots overlap each other by an overlap factor of at least 0.30.

11. The method of claim 10 wherein the first, second and third spot are congruent.

12. The method of claim 10 wherein centers of the three spots are displaced from centers of other spots parallel to a line along which the spots are scanned.

13. The method of claim 10 wherein centers of the three spots are displaced from centers of other spots in a direction perpendicular to a line along which the spots are scanned.

14. The method of claim 10 wherein centers of the three spots are displaced from centers of other spots in a direction having vectors both parallel to and perpendicular to a line along which spots are scanned.

15. The method of claim 6, further comprising the step of increasing the sharpness transfer function of the formed image by directing the radiation beam to form a third spot, wherein the first, second and third spots overlap each other by an overlap factor of at least 0.50.

16. The method of claim 6, further comprising the step of increasing the sharpness transfer function of the formed image by directing the radiation beam to form a third spot, wherein the first, second and third spots overlap each other by an overlap factor of at least 0.70.

17. The method of claim 6, further comprising the step of increasing the sharpness transfer function of the formed image by directing the radiation beam to form a third spot, wherein the first, second and third spots overlap each other by an overlap factor of at least 0.80.

18. The method of claim 6 wherein a center of the first spot is displaced from a center of the second spot parallel to a line along which the spots are scanned.

19. The process of claim 6 wherein a center of the first spot is displaced from a center of the second spot in a direction perpendicular to a line along which the spots are scanned.

20. The method of claim 6 wherein a center of the first dot is displaced from a center of the second spot in a direction having vectors both parallel to and perpendicular to a line along which the spots are scanned.

21. The method of claim 6, wherein the sharpness transfer function of the image is at least 0.2 greater than the sharpness transfer of the first spot.

* * * * *

UNITED STATES PATENT AND TRADEMARK OFFICE
CERTIFICATE OF CORRECTION

PATENT NO.: 5,780,207
DATED: July 14, 1998
INVENTOR(S): Sarat K. Mohapatra et al.

It is certified that error appears in the above-identified patent and that said Letters Patent is hereby corrected as shown below:

In the drawings:

Sheet 3 of 13, Figure 4, "SEPERATION" should read --SEPARATION--.

Column 4, line 13, "raiation" should read --radiation--.

Column 13, line 38, "enrgy" should read --energy--.

Column 16, line 8, "EXAMPLE 3" should read --EXAMPLE 2--.

Column 16, line 65, "simultaneaous" should read --simultaneous--.

Column 17, line 58, "will be same" should read --will be the same--.

Signed and Sealed this

First Day of June, 1999

*Attest:*

Q. TODD DICKINSON

*Attesting Officer*   *Acting Commissioner of Patents and Trademarks*